(12) United States Patent
Jaenisch et al.

(10) Patent No.: US 11,507,847 B2
(45) Date of Patent: Nov. 22, 2022

(54) GENE EXPRESSION PROGRAMMING

(71) Applicant: Raytheon Company, Waltham, MA (US)

(72) Inventors: Holger M. Jaenisch, Toney, AL (US); James W. Handley, Toney, AL (US)

(73) Assignee: Raytheon Company, Waltham, MA (US)

( * ) Notice: Subject to any disclaimer, the term of this patent is extended or adjusted under 35 U.S.C. 154(b) by 319 days.

(21) Appl. No.: 16/522,235

(22) Filed: Jul. 25, 2019

(65) Prior Publication Data

US 2021/0027171 A1 Jan. 28, 2021

(51) Int. Cl.
| | | |
|---|---|---|
| *G06F 17/13* | (2006.01) | |
| *C12Q 1/6883* | (2018.01) | |
| *G16B 20/00* | (2019.01) | |
| *G06N 3/12* | (2006.01) | |
| *G06N 5/04* | (2006.01) | |

(52) U.S. Cl.
CPC .............. *G06N 3/126* (2013.01); *G06N 5/041* (2013.01)

(58) Field of Classification Search
CPC ....... G06N 3/126; G06N 5/041; H04W 12/12; G06F 21/55; H04L 63/14
USPC ...................................................... 706/1–62
See application file for complete search history.

(56) References Cited

U.S. PATENT DOCUMENTS

| | | | |
|---|---|---|---|
| 6,760,032 B1 | 7/2004 | James | |
| 6,941,236 B2 | 9/2005 | Huelsbergen et al. | |
| 7,036,016 B1 | 4/2006 | Smith, Jr. | |
| 8,301,387 B2 * | 10/2012 | Hwa | G16B 5/10 |
| | | | 702/19 |
| 8,516,596 B2 | 8/2013 | Sandoval et al. | |
| 8,839,417 B1 | 9/2014 | Jordan | |
| 9,245,116 B2 | 1/2016 | Evans et al. | |
| 10,076,273 B2 * | 9/2018 | Berckmans | A61B 5/165 |
| 10,110,629 B1 | 10/2018 | Kruse et al. | |
| 10,298,598 B1 | 5/2019 | Mcclintock et al. | |
| 10,326,796 B1 | 6/2019 | Varadarajan et al. | |
| 10,507,973 B2 | 12/2019 | Park | |
| 10,521,584 B1 | 12/2019 | Sharifi Mehr | |
| 10,929,722 B2 | 2/2021 | Cheng et al. | |

(Continued)

FOREIGN PATENT DOCUMENTS

| | | |
|---|---|---|
| EP | 2942919 A1 | 11/2015 |
| WO | WO-2019199675 A1 | 10/2019 |

(Continued)

OTHER PUBLICATIONS

"U.S. Appl. No. 16/281,888, Examiner Interview Summary dated Aug. 10, 2020", 3 pgs.

(Continued)

*Primary Examiner* — Brandon S Cole
(74) *Attorney, Agent, or Firm* — Schwegman Lundberg & Woessner, P.A.

(57) ABSTRACT

Gene expression programming-based behavior monitoring is disclosed. A machine receives, as input, a plurality of data examples. A method can include receiving data indicating behaviors of the device, determining, using a gene expression programming (GEP) method, a data model that explains the data, and comparing further data indicating further behavior of the device to the data model to determine whether the further behavior is explained by the data model.

14 Claims, 15 Drawing Sheets

(56) References Cited

U.S. PATENT DOCUMENTS

| | | | |
|---|---|---|---|
| 10,937,465 B2 | 3/2021 | Jaenisch et al. | |
| 11,036,858 B2 | 6/2021 | Chistyakov et al. | |
| 11,132,923 B2 | 9/2021 | Jaenisch et al. | |
| 11,321,462 B2 | 5/2022 | Jaenisch et al. | |
| 11,340,603 B2 | 5/2022 | Jaenisch et al. | |
| 11,341,235 B2 | 5/2022 | Jaenisch et al. | |
| 2003/0084349 A1 | 5/2003 | Friedrichs et al. | |
| 2003/0115021 A1 | 6/2003 | Mates | |
| 2003/0174895 A1 | 9/2003 | Hsieh | |
| 2006/0009956 A1* | 1/2006 | Winckel | G06F 17/13 703/2 |
| 2006/0101516 A1 | 5/2006 | Sudaharan et al. | |
| 2007/0112585 A1* | 5/2007 | Breiter | G16H 30/20 705/2 |
| 2007/0245119 A1 | 10/2007 | Hoppe | |
| 2009/0241006 A1 | 9/2009 | Liikanen et al. | |
| 2010/0064370 A1 | 3/2010 | Chamley et al. | |
| 2011/0238855 A1 | 9/2011 | Korsunsky et al. | |
| 2012/0240185 A1 | 9/2012 | Kapoor et al. | |
| 2013/0145465 A1 | 6/2013 | Wang et al. | |
| 2014/0289852 A1 | 9/2014 | Evans et al. | |
| 2015/0026582 A1 | 1/2015 | Basak | |
| 2015/0100556 A1 | 4/2015 | Sekiguchi et al. | |
| 2015/0131796 A1 | 5/2015 | Milsted | |
| 2015/0154796 A1 | 6/2015 | Co | |
| 2015/0206315 A1 | 7/2015 | Price et al. | |
| 2015/0295907 A1 | 10/2015 | Abrahamson | |
| 2016/0321323 A1 | 11/2016 | Gaumnitz et al. | |
| 2016/0359685 A1 | 12/2016 | Yadav et al. | |
| 2016/0359876 A1 | 12/2016 | Touboul et al. | |
| 2016/0359886 A1 | 12/2016 | Yadav et al. | |
| 2017/0007148 A1* | 1/2017 | Kaditz | A61B 5/055 |
| 2017/0149787 A1 | 5/2017 | Niemela et al. | |
| 2017/0223052 A1 | 8/2017 | Stutz | |
| 2017/0257396 A1 | 9/2017 | Shen et al. | |
| 2017/0302691 A1 | 10/2017 | Singh et al. | |
| 2017/0310690 A1 | 10/2017 | Mestha et al. | |
| 2017/0310705 A1 | 10/2017 | Gopalakrishna et al. | |
| 2017/0327890 A1* | 11/2017 | Saint-Andre | C12Q 1/6883 |
| 2018/0027004 A1 | 1/2018 | Huang et al. | |
| 2018/0085011 A1* | 3/2018 | Ma | A61B 5/1102 |
| 2018/0137277 A1 | 5/2018 | Mestha et al. | |
| 2018/0160905 A1* | 6/2018 | Wang | A61B 5/0004 |
| 2018/0204111 A1 | 7/2018 | Zadeh et al. | |
| 2018/0336436 A1 | 11/2018 | Cheng et al. | |
| 2018/0337935 A1 | 11/2018 | Marwah et al. | |
| 2018/0374109 A1 | 12/2018 | Scarpati et al. | |
| 2019/0018375 A1 | 1/2019 | Deshpande | |
| 2019/0149565 A1 | 5/2019 | Hagi et al. | |
| 2019/0180181 A1* | 6/2019 | Lilley | G06N 3/082 |
| 2019/0196746 A1 | 6/2019 | Fujimoto et al. | |
| 2019/0279112 A1 | 9/2019 | Jaenisch et al. | |
| 2019/0289034 A1 | 9/2019 | Erez et al. | |
| 2019/0296913 A1 | 9/2019 | Verma et al. | |
| 2019/0311120 A1 | 10/2019 | Jaenisch et al. | |
| 2019/0312908 A1 | 10/2019 | Jaenisch et al. | |
| 2019/0383874 A1* | 12/2019 | Jaenisch | G06F 30/20 |
| 2020/0202749 A1 | 6/2020 | Jaenisch et al. | |
| 2020/0204574 A1 | 6/2020 | Christian | |
| 2020/0272731 A1 | 8/2020 | Jaenisch et al. | |
| 2020/0273499 A1 | 8/2020 | Jaenisch et al. | |
| 2020/0326695 A1 | 10/2020 | Jaenisch et al. | |
| 2020/0362334 A1* | 11/2020 | Regev | C12Q 1/6869 |
| 2021/0027171 A1* | 1/2021 | Jaenisch | H04L 63/14 |
| 2021/0060858 A1* | 3/2021 | Rakshit | B33Y 50/00 |

FOREIGN PATENT DOCUMENTS

| | | | |
|---|---|---|---|
| WO | WO-2019199769 A1 | 10/2019 | |
| WO | WO-2019199777 A1 | 10/2019 | |
| WO | WO-2020172122 A1 | 8/2020 | |
| WO | WO-2020172124 A1 | 8/2020 | |
| WO | WO-2021016533 A1 | 1/2021 | |

OTHER PUBLICATIONS

"U.S. Appl. No. 16/281,888, Non Final Office Action dated May 19, 2020", 15 pgs.

"U.S. Appl. No. 16/281,888, Notice of Allowance dated Oct. 20, 2020", 12 pgs.

"U.S. Appl. No. 16/281,888, Response filed Aug. 18, 2020 to Non Final Office Action dated May 19, 2020", 10 pgs.

"U.S. Appl. No. 16/379,154, Non Final Office Action dated Oct. 15, 2020", 25 pgs.

"U.S. Appl. No. 16/379,162, Non Final Office Action dated Nov. 10, 2020", 20 pgs.

"International Application Serial No. PCT/US2019/026338, International Preliminary Report on Patentability dated Oct. 22, 2020", 9 pgs.

"International Application Serial No. PCT/US2019/026514, International Preliminary Report on Patentability dated Oct. 22, 2020", 7 pgs.

"International Application Serial No. PCT/US2019/026522, International Preliminary Report on Patentability dated Oct. 22, 2020", 7 pgs.

"International Application Serial No. PCT/US2020/018570, International Search Report dated Apr. 28, 2020", 4 pgs.

"International Application Serial No. PCT/US2020/018570, Written Opinion dated Apr. 28, 2020", 7 pgs.

"International Application Serial No. PCT/US2020/018574, International Search Report dated Apr. 28, 2020", 4 pgs.

"International Application Serial No. PCT/US2020/018574, Written Opinion dated Apr. 28, 2020", 7 pgs.

"International Application Serial No. PCT/US2020/043434, International Search Report dated Oct. 16, 2020", 4 pgs.

"international Application Serial No. PCT/US2020/043434, Written Opinion dated Oct. 16, 2020", 5 pgs.

Deng, Song, et al., "Distributed intrusion detection based on hybrid gene expression programming and cloud computing in a cyber physical power system", IET Control Theory And Applications, The Institution Of Engineering And Technology, GB, vol. 11, No. 11, (Jul. 14, 2017), 1822-1829.

Elsayed, Saber, et al., "Evaluating the performance of a differential evolution algorithm in anomaly detection", IEEE Congress on Evolutionary Computation (CEC), IEEE, (May 25, 2015), 2490-2497.

Holnglei, Gao, et al., "A GEP-Based Anomaly Detection Scheme in Wireless Sensor Networks", Computational Science and Engineering, CSE '09. International Conference On, IEEE, Piscataway, NJ, USA, (Aug. 29, 2009), 817-822.

"International Application Serial No. PCT/US2019/026338, International Search Report dated Jun. 21, 2019", 5 pgs.

"International Application Serial No. PCT/US2019/026338, Written Opinion dated Jun. 21, 2019", 7 pgs.

"International Application Serial No. PCT/US2019/026514, International Search Report dated Jul. 5, 2019", 5 pgs.

"International Application Serial No. PCT/US2019/026514, Written Opinion dated Jul. 5, 2019", 8 pgs.

"International Application Serial No. PCT/US2019/026522, International Search Report dated Jul. 8, 2019", 4 pgs.

"International Application Serial No. PCT/US2019/026522, Written Opinion dated Jul. 8, 2019", 5 pgs.

Farlow, Stanley, "The GMDH Algorithm of Ivakhnenko", The American Statistician, vol. 35, No. 4, (1981), 210-215.

Ferreira, Candida, "Gene Expression Programming in Problem Solving", Soft Computing and Industry, (2002), 635-653.

Ferreira, Candida, "Gene Expression Programming: A New Adaptive Algorithm for Solving Problems", Complex Systems, vol. 13, issue 2, (2001), 22 pgs.

Gabor, D, et al., "A Universal Non-linear filter, predictor and simulator which optimizes", The Institution of Electrical Engineers, Paper No. 3270 M, (1960), 422-435.

Ivakhnenko, A G, "Heuristic Self-Organization in Problems of Engineering Cybernetics", Automatica, vol. 6, (1969), 207-219.

(56) References Cited

OTHER PUBLICATIONS

Ivakhnenko, A G, et al., "The Review of Problems Solvable by Algorithms of the Group Method of Data Handling (GMDH)", Pattern Recognition and Image Analysis, vol. 5, No. 4, (1995), 527-535.
Jaenisch, H, et al., "Generalized information fusion and visualization using spatial voting and data modeling", Society of Photo-Optical Instrumentation Engineers SPIE Proceedings vol. 8756 No. 875609, (May 2013), 16 pgs.
Jaenisch, Holger, et al., "A novel application of data modeling for extracting mathematical ontologies and relationship matrix features from text documents", SPIE Defense + Commercial Sensing, (2005), 12 pgs.
Jaenisch, Holger, et al., "A robust regularization algorithm for polynomial networks for machine-learning", Proc. SPIE 8059, Evolutionary and Bio-Inspired Computation: Theory and Applications V, 80590A, (May 2011), 21 pgs.
Jaenisch, Holger, et al., "Autonomous Journaling Response Using Data Model LUTS", Proc. of SPIE vol. 7344, (2009), 11 pgs.
Jaenisch, Holger, "Converting data into functions for continuous wavelet analysis", Proceedings of SPIE—The International Society for Optical Engineering, (pp. 2-13), (2009), 13 pgs.
Jaenisch, Holger, "Data Modeling Applications in Space Science and Astronomy", PhD thesis, James Cook University (pp. 1-130 of 255 pages total), (2009), 130 pgs.
Jaenisch, Holger, "Data Modeling Applications in Space Science and Astronomy", PhD thesis, James Cook University (pp. 131-256 of 255 pages total), (2009), 126 pgs.
Jaenisch, Holger, et al., "Data Modeling for Change Detection of Inventory Flow and Instrument Calibration", Proceedings of SOLE, (2003), 10 pgs.
Jaenisch, Holger, et al. "Data Modeling for Fault Detection", MFPT, (2003), 10 pgs.
Jaenisch, Holger, et al., "Data Modeling for network dynamics", Proceedings of SPIE—The International Society for Optical Engineering, (2004), 12 pgs.
Jaenisch, Holger, et al., "Data Modeling for Predictive Behavior Hypothesis Formation and Testing", Proc. SPIE 6241, Data Mining, Intrusion Detection, Information Assurance, and Data Networks Security, (2006), 12 pgs.
Jaenisch, Holger, et al., "Data-modeling-enabled guidance, navigation, and control to enhance the lethality of interceptors against maneuvering targets", Proceedings of SPIE—The International Society for Optical Engineering • Mar. 2005, 13 pgs.
Jaenisch, Holger, et al., "Digital MicroArray Analysis For Digital Artifact Genomics", Cyber Sensing, (2013), 20 pgs.
Jaenisch, Holger, "Entropyology: Microarray Analysis Analogy for Digital Artifact Discrimination", Proceedings of SPIE, vol. 8359, (2012), 20 pgs.
Jaenisch, Holger, "Geospatial Feature Based Automatic Target Recognition (ATR) using data models", Proceedings vol. 7697, Signal Processing, Sensor Fusion, and Target Recognition XIX, (2010), 12 pgs.
Jaenisch, Holger, et al., "Insider Threat Detection Enabled by Converting User Applications into Fractal Fingerprints and Autonomously Detecting Anomalies", SPIE Proceedings vol. 8408, (2012), 22 pgs.
Jaenisch, Holger, et al., "Performance Comparison of the Prophecy (Forecasting) Algorithm in FFT Form for Unseen Feature and Time-Series Prediction", Proc. SPIE 8757, Cyber Sensing, (2013), 30 pgs.
Jaenisch, Holger, et al., "Shai-Hulud The quest for worm sign", Proc. SPIE 5812, Data Mining, Intrusion Detection, Information Assurance, and Data Networks Security, (2005), 9 pgs.
Jaenisch, Holger, et al., "Spatial Voting For Automatic Feature Selection, Fusion and Visualization", Proc. SPIE 8756, Multisensor, Multisource Information Fusion: Architectures, Algorithms, and Applications, (2013), 21 pgs.
Jaenisch, Holger, "Spatial Voting with Data Modeling", Sensor Fusions and its Applications, (2010), 153-178.
Jaenisch, Holger, et al., "Virtual Instrument Prototyping with Data Modeling", (2003), 15 pgs.
Kamalika, Bhattacharjee, et al., "A Survey of Cellular Automata: Types, Dynamics, Non-uniformity and Applications", Arxiv.Org, Cornell University Library, 201 Olin Library Cornell University Ithaca, NY, (Jul. 8, 2016).
Oltean, Mihai, et al., "An autonomous GP-based system for regression and classification problems", Applied Soft Computing 9, (2009), 49-60.
U.S. Appl. No. 16/297,202, filed Mar. 8, 2019, Machine Learning Technique Selection and Improvement.
U.S. Appl. No. 16/265,526, filed Feb. 1, 2019, Device Behavior Anomaly Detection.
U.S. Appl. No. 16/379,154, filed Apr. 9, 2019, Cyber Chaff Using Spatial Voting.
U.S. Appl. No. 16/379,162, filed Apr. 9, 2019, Encryption Using Spatial Voting.
U.S. Appl. No. 16/381,179, filed Apr. 11, 2019, Behavior Monitoring Using Convolutional Data Modeling.
U.S. Appl. No. 16/554,206, filed Aug. 28, 2019, Alternative Techniques for Design of Experiments.
U.S. Appl. No. 16/281,888, filed Feb. 21, 2019, Anomaly Detection With Reduced Memory Overhead.
U.S. Appl. No. 16/281,922, filed Feb. 21, 2019, Anomaly Detection With Adaptive Auto Grouping.
"U.S. Appl. No. 16/265,526, Examiner Interview Summary dated Sep. 23, 2021", 2 pgs.
"U.S. Appl. No. 16/265,526, Non Final Office Action dated Jul. 12, 2021", 16 pgs.
"U.S. Appl. No. 16/265,526, Response filed Oct. 11, 2021 to Non Final Office Action dated Jul. 12, 2021", 9 pgs.
"U.S. Appl. No. 16/281,888, Corrected Notice of Allowability dated Jan. 27, 2021", 2 pgs.
"U.S. Appl. No. 16/281,922, Non Final Office Action dated Sep. 2, 2021", 9 pgs.
"U.S. Appl. No. 16/379,154, Advisory Action dated Aug. 30, 2021", 6 pgs.
"U.S. Appl. No. 16/379,154, Amendment & Response Under 37 C.F.R. § 1.116 filed Sep. 29, 2021", 11 pgs.
"U.S. Appl. No. 16/379,154, Examiner Interview Summary dated Jan. 8, 2021", 2 pgs.
"U.S. Appl. No. 16/379,154, Final Office Action dated Apr. 29, 2021", 32 pgs.
"U.S. Appl. No. 16/379,154, Response filed Jan. 14, 2021 to Non Final Office Action dated Oct. 15, 2020", 10 pgs.
"U.S. Appl. No. 16/379,154, Response filed Jul. 29, 2021 to Final Office Action dated Apr. 29, 2021", 11 pgs.
"U.S. Appl. No. 16/379,162, Examiner Interview Summary dated Feb. 12, 2021", 2 pgs.
"U.S. Appl. No. 16/379,162, Notice of Allowance dated May 26, 2021", 11 pgs.
"U.S. Appl. No. 16/379,162, Response filed Feb. 10, 2021 to Non Final Office Action dated Nov. 10, 2020", 8 pgs.
"U.S. Appl. No. 16/379,162, Supplemental Notice of Allowability dated Aug. 18, 2021", 3 pgs.
"U.S. Appl. No. 16/381,179, Examiner Interview Summary dated Sep. 30, 2021", 2 pgs.
"U.S. Appl. No. 16/381,179, Non Final Office Action dated Jun. 25, 2021", 10 pgs.
"U.S. Appl. No. 16/381,179, Response filed Sep. 27, 2021 to Non Final Office Action dated Jun. 25, 2021", 10 pgs.
"International Application Serial No. PCT/US2020/018570, International Preliminary Report on Patentability dated Sep. 2, 2021", 9 pgs.
"International Application Serial No. PCT/US2020/018574, International Preliminary Report on Patentability dated Sep. 2, 2021", 9 pgs.
"U.S. Appl. No. 16/265,526, Corrected Notice of Allowability dated Jan. 5, 2022", 2 pgs.
"U.S. Appl. No. 16/265,526, Notice of Allowance dated Dec. 27, 2021", 10 pgs.
"U.S. Appl. No. 16/281,922, Examiner Interview Summary dated Nov. 29, 2021", 2 pgs.

(56) References Cited

OTHER PUBLICATIONS

"U.S. Appl. No. 16/281,922, Notice of Allowance dated Jan. 20, 2022", 8 pgs.
"U.S. Appl. No. 16/281,922, Response filed Dec. 2, 2021 to Non Final Office Action dated Sep. 2, 2021", 11 pgs.
"U.S. Appl. No. 16/297,202, Non Final Office Action dated Jan. 25, 2022", 10 pgs.
"U.S. Appl. No. 16/381,179, Notice of Allowance dated Jan. 21, 2022", 7 pgs.
"International Application Serial No. PCT/US2020/043434, International Preliminary Report on Patentability dated Feb. 3, 2022", 7 pgs.
"U.S. Appl. No. 16/297,202, Examiner Interview Summary dated Apr. 5, 2022", 2 pgs.
"U.S. Appl. No. 16/297,202, Notice of Allowance dated May 4, 2022", 5 pgs.
"U.S. Appl. No. 16/379,154, Response filed Apr. 25, 2022 to Non Final Office Action dated Jan. 25, 2022", 9 pgs.
"U.S. Appl. No. 16/379,154, Notice of Allowance dated Mar. 2, 2022", 13 pgs.

* cited by examiner

GENE EXPRESSION PROGRAMMING

TECHNICAL FIELD

Embodiments regard behavior monitoring. Some embodiments can be implemented on an embedded device due to the efficiency of behavior monitoring solutions.

BACKGROUND

Modeling a system state may be challenging as different conditions of the system may correspond to different relationships between variables, which may be difficult to predict. Deriving a model to predict a system state using analytical equations of system variables may be desirable. Current solutions to data modeling are woefully incapable of modeling complex system behavior, such as systems with data greater than order 14.

SUMMARY

Figure 1:
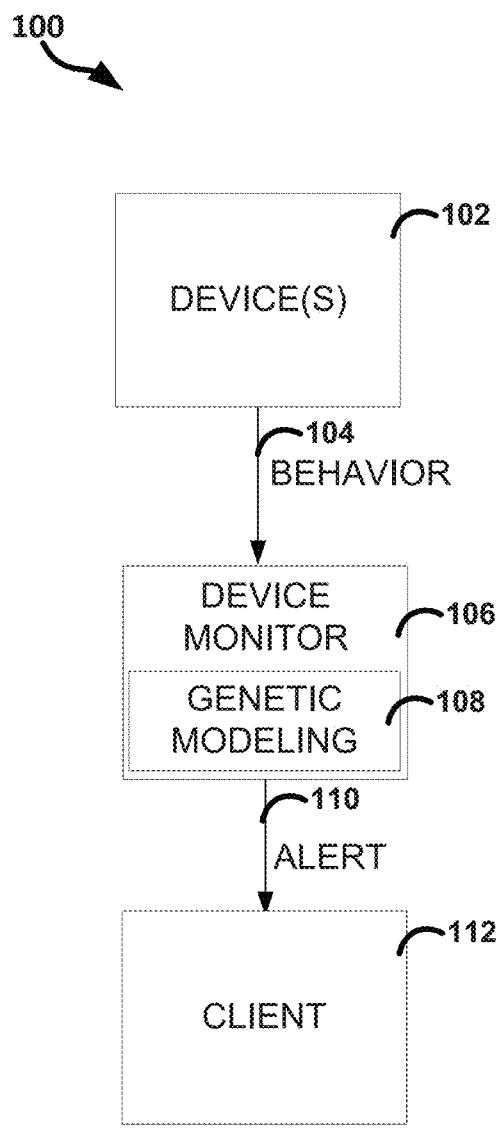
FIG. 1 illustrates, by way of example, a diagram of an embodiment of a system for behavior monitoring.

The present disclosure generally relates to behavior monitoring using gene expression programming (GEP). Embodiments can be implemented in embedded computational hardware due to the low memory space and low processor bandwidth requirements. Embodiments can be applied to formal analytical methods for inverse system modeling, inverse parameter estimation, or system of systems emulation/simulation, among many other data modeling applications. Embodiments present instantiations specifically tailored to enable instantiations in graphical processing unit (GPU), field programmable gate array (FPGA), application specific integrated circuit (ASIC), hybrid metamaterial, or optical computational hardware, or the like. The following means and methods illustrate how the goals of modern Machine Learning (ML) methods can be achieved without the pitfalls and high memory or processor bandwidth costs of the ML techniques.

To accomplish this, ITM are used in lieu of statistical and probability-based methods. This helps assure analytical bounded properties are leveraged and maintained. All decision aides and processes derived by embodiments avoid the ML method limitations and pitfalls of Wolpert's No Free Lunch (NFL) theorem when used for data and system behavior explanation, rather than an optimization-based strategy for obtaining equal error rate-based approximation estimators with confidence intervals.

Embodiments enable a device to have abductive reasoning achieved with self-organizing partial explainers, explaining all results obtained to date as a formal and testable mathematical hypothesis. This allows working with a fixed specificity of one (1) while allowing sensitivity to vary and grow as is required to explain all data.

This is in contrast with ML methods that strive to achieve equal error rates and a balance between specificity and sensitivity, thereby nearly assuring every generated answer is wrong (e.g., by some variable amount). Further, ML methods are incapable of declaring when new data cases are outside of the bounds of relevance of the underlying conjectured decision-making architecture. Embodiments do not suffer from these issues and are capable of determining when a new data case is outside the bounds of relevance of the architecture.

Embodiments are strictly defined in mathematical terms. In embodiments, a self-organizing data-driven set of equations that explain all presently observed data can be autonomously discovered. The equations can be non-relevant to a newly encountered set of one or more observation measurements. This ability for the computational model to be self-aware of new unknown-unknown data (being like the self-defined hypothesis or unrelated to it) makes embodiments unique, scalable, and maintainable with performance bounds directly computable by formal analysis of the mathematical structure.

The small footprint of embodiments, in terms of memory and computation requirements, enables reduction to practice with fast and efficient techniques that are not afforded to deep learning convolutional neural networks and similar structures that are based on hyper-parameterization.

According to some aspects of the technology described herein, an apparatus includes processing circuitry and memory. The processing circuitry receives, as input, a plurality of data examples.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments can include behavior analysis (e.g., anomalous or malicious behavior detection) using GEP. In GEP, a set of chromosomes forms a genome. The chromosomes are subject to alterations, such as by mutation, transposition, recombination, or a combination thereof. In general, GEP takes a population of individuals as input, alters one or more of the individuals and adds the modified individual to the population, and selects individuals based on a fitness function for a next generation. GEP, as used herein, can include a genetic algorithm, genetic programming, or gene expression programming, in the usual senses of the terms.

FIG. 1 illustrates, by way of example, a diagram of an embodiment of a system 100 for behavior monitoring. The system 100 as illustrated includes at least one device 102, and a device monitor 106. Each device 102 can include circuitry, software, or a combination thereof, that produces an output, called a behavior 104. The behavior 104 of the device 102 can include a voltage level, a current level, a power level, a packet, a data stream, sensor data, a file, or other data. For example, the device 102 can include one or more electric or electronic components that produce an electrical response to a stimulus. In another example, the device 102 can include software to receives a stimulus and produces a response to the stimulus.

The device monitor 106 as illustrated includes genetic modeling circuitry 208. The device monitor 106 receives the behavior 104 and determines whether the behavior 104 is consistent with a behavior model generated by the genetic modeling circuitry 108. If the behavior 104 is not consistent with the behavior model, the device monitor 106 can issue an alert 110 to a client device 112. The device monitor 106 can cause the genetic modeling circuitry 108 to update a behavior model of the device 102.

The genetic modeling circuitry 108 can receive the behavior 104 and generate a model based on the behavior 104. The model can be determined using a GEP technique. More details regarding embodiments of the model are provided regarding FIGS. 2-4.

Behavior consistent with the model means that the behavior (a) is more than a threshold distance away from the function used by the model; (b) is more than a threshold different from previous behavior (e.g., by variance, standard deviation, or the like), or the like.

The client 112 is a device associated with an entity that is responsible for maintenance of the device 102. The client 112 can include a smart phone, tablet, desktop computer, laptop computer, a speaker, a television or other optical device, or the like. The alert 110 can be presented by the client 112 to indicate the device 102, the behavior 104, a time, date, or the like, of the behavior 104. The alert 110 can indicate one or more operations that were performed before or after the behavior 104, such as to provide context.

Figure 2:
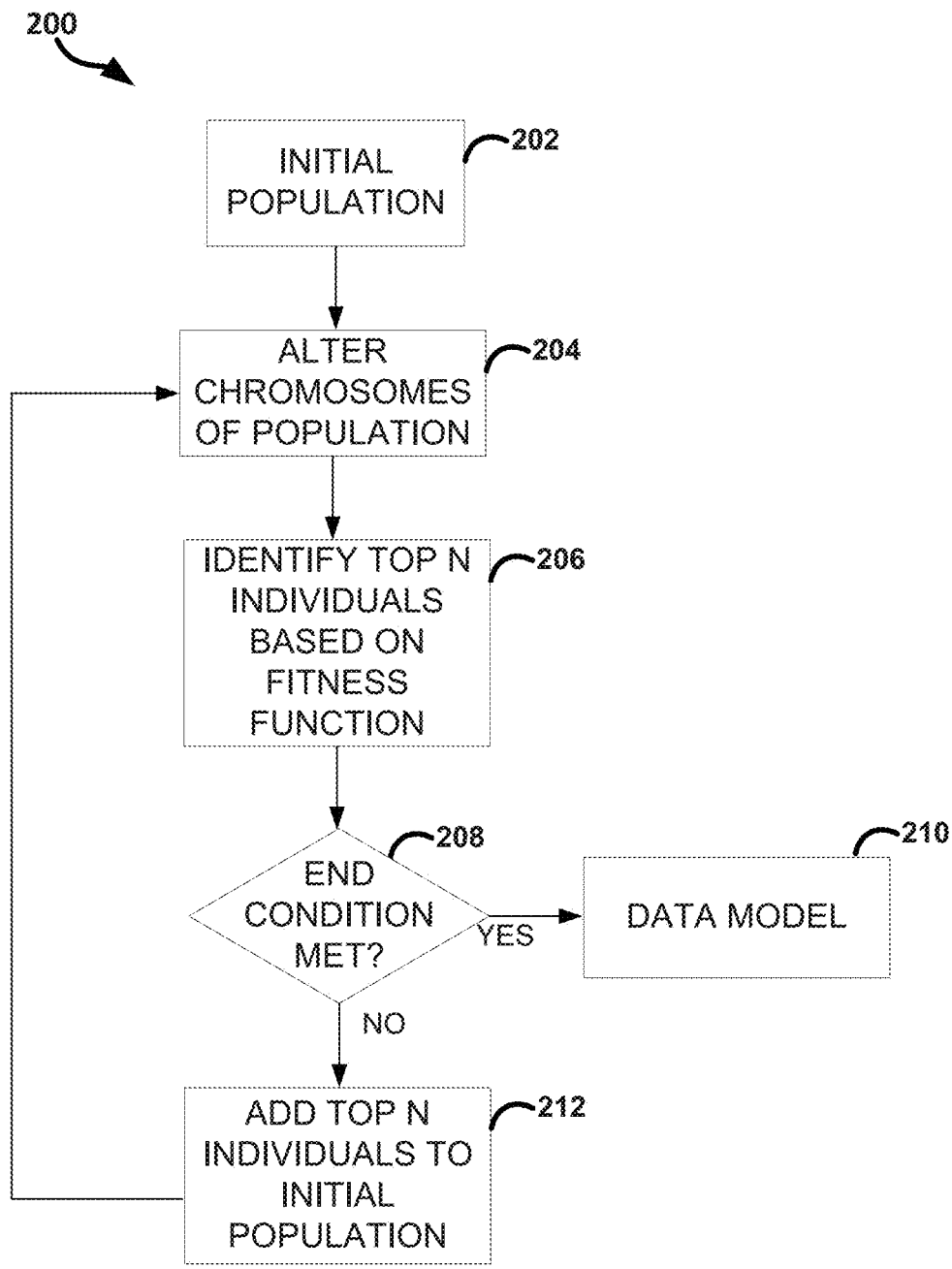
FIG. 2 illustrates, by way of example, a diagram of an embodiment of a GEP modeling method.

FIG. 2 illustrates, by way of example, a diagram of an embodiment of a GEP modeling method 200. The method 200 as illustrated includes generating or retrieving an initial population, at operation 202. The initial population comprises entities with genomes comprised of chromosomes. Each of the chromosomes comprises one more variables, operators, or a combination thereof. A variable is an element that can change value. In the expression A*x+B*y=C, x and y are variables. The operator is a symbol that denotes an operation. In the previous expression, * (indicating multiplication) and + (indicating summation) are operators.

At operation 204, one or more chromosomes of an entity of the population can be altered. Altering can include mutation, transposition, insertion, recombination, or a combination thereof. Mutation includes altering a portion of a chromosome to another variable or operator. Note that an operator can be replaced with only another operator and a variable can be replaced with either an operator or a variable. Transposition includes movement of a portion of a chromosome to another spot in the chromosome. The transposition can be constrained to include one or more operators and corresponding variables. Insertion includes adding one or more operators or variables to the chromosome. Recombination includes exchanging entities between two chromosomes. Consider the following binary sequences {001000000} and {101000011}. A recombination of the sequences can include exchanging the first four entities of the sequences to generate the following progeny {101000000} and {001000011}. Note that, for each altered entity, a parent (an entity whose genetic material was altered to generate the altered entity) can be removed or remain. By removing the parent and retaining the altered entity (sometimes called a child or progeny), a population can remain a same size. By retaining the parent, the population can grow.

In performing each alteration, prior GEP techniques use a random number generator. The random number generator is used to generate a value. The value generated dictates whether an alteration occurs and can even dictate the specific alteration that occurs. Drawbacks with prior random number generators include time and memory constraints. Using a sincos function gets rid of a pseudorandom number generator process and replaces it with a function. The function consumes less memory space and reduces computations and memory accesses. Instead of using a prior random number generator, embodiments can use a mathematical combination of orthogonal, sometimes cyclic, functions to generate a value. The value can be used in place of a value generated by the random number generator. More details regarding generating the value and performing the alteration are described regarding FIG. 3.

At operation 206, the top N individuals of the population can be identified based on a fitness function. N can be an integer greater than or equal to 1. The top N individuals are the individuals in the population that (alone or in combination) best satisfy a fitness function. The fitness function, in embodiments, can include an ability to explain the behavior 104 of the device 102. The fitness function can include an error (root mean square error, covariance, or the like) that indicates a difference between the top N individuals and the behavior 104. An error of zero, means that the top N individuals perfectly explain the behavior 104. This error may not be attainable in all cases.

At operation 208, it can be determined if an end condition is met. The end condition can include the error being below a threshold. The end condition can include using an analytical hierarchical processing (AHP) technique. Details regarding AHP are provided regarding FIGS. 7 and 8.

If the end condition is met, as determined at operation 208, the data model can be provided at operation 210. The data model can include a combination of one or more of the top N individuals. If the end condition is not met, as determined at operation 208, the top N individuals can be added to the initial population at operation 212. The top N individuals can replace the top N individuals from a previous iteration (to keep the size of the population static) or can be added along with the previous top N individuals (to grow the population). Growing the population can require more processing operations per iteration than keeping the population static. The operation 204 can be performed after the operation 212.

Figure 3:
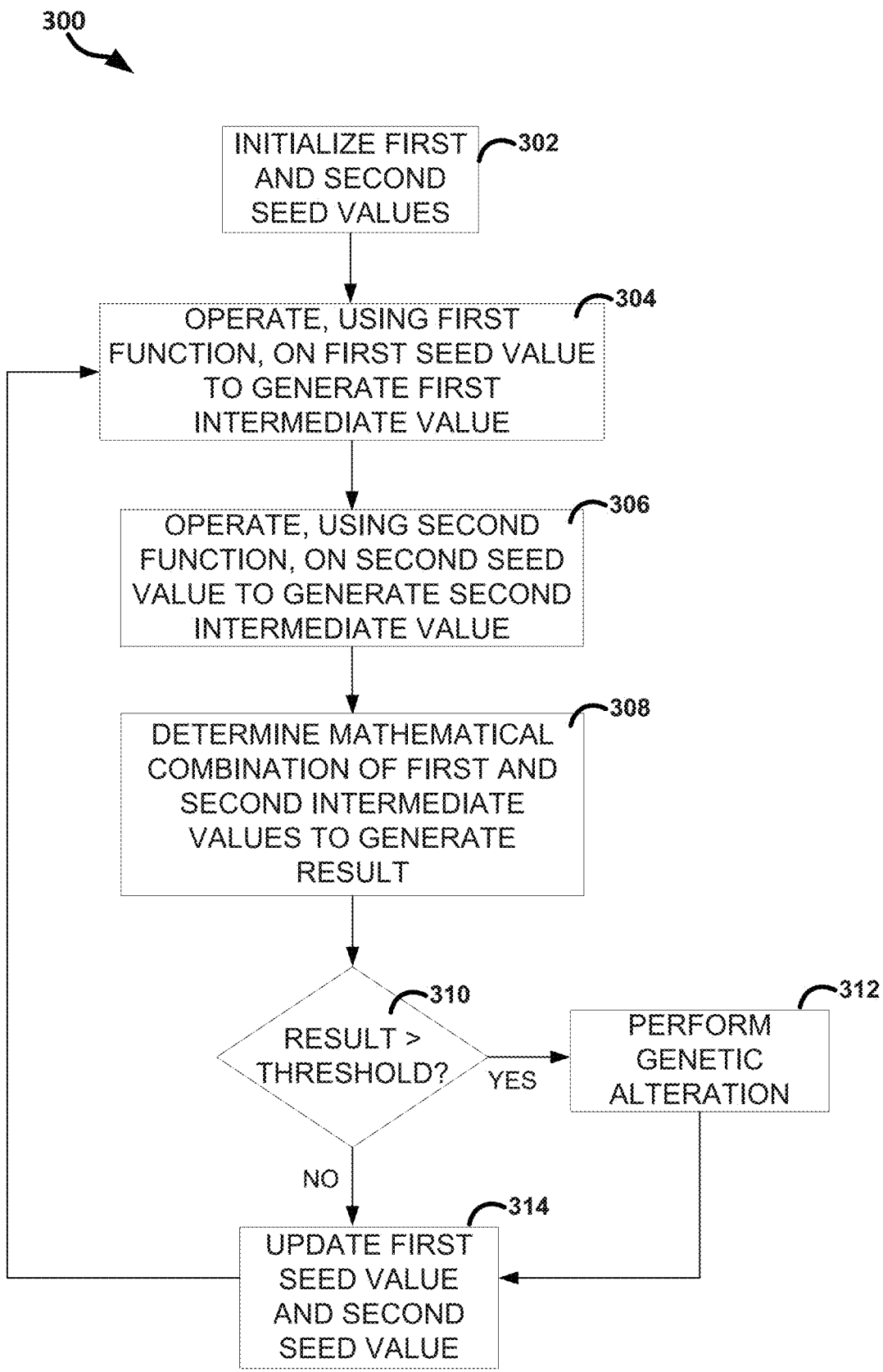
FIG. 3 illustrates, by way of example, a diagram of an embodiment of a method for determining a value that governs genetic alteration.

FIG. 3 illustrates, by way of example, a diagram of an embodiment of a method 300 for determining a value that governs genetic alteration. The method 300 includes initializing first and second seed values 302. The first and second seed values 302 can be chosen to make the result of the sincos function produce results that are uniformly distributed. However, other values can be chosen for either of these seed values.

At operation 304, a first function can be used on the first seed value to generate a first intermediate value. The first function can include a cyclic function, periodic function, or the like. A cyclic function is one that produces a same output for different input. A periodic function is a special case of a cyclic function that repeats a series of output values for different input values. Examples of periodic functions include sine, cosine, or the like. In some embodiments, the first seed value can be raised to a power before being input into the first function. The power can be any value, such as an integer, fraction, transcendental number, or the like.

At operation 306, a second function can operate on the second seed value to generate a second intermediate value. The second function can be orthogonal to the first function. In some embodiments, the second seed value can be raised to a power before being input into the first function. The power can be any value, such as an integer, fraction, transcendental number, or the like. Using a transcendental number can increase memory or processing overhead but can produce results that are more random than a fraction or integer.

At operation 308, the first intermediate value and the second intermediate value can be mathematically combined to generate a result. The mathematical combination can include weighting either the first intermediate value or the second intermediate value. In some embodiments, the weighting can constrain the result to a specified range of values (e.g., [min, max]). For example, to constrain the result in which the first function is a sine function, the second function is a cosine function, and the mathematical combination is addition, the weighting can include division by two. The mathematical combination can include an addition, multiplication, division, subtraction, logarithm, exponential, integration, differentiation, transform, or the like. The mathematical combination can include adding a constant to shift the range of values to be more positive or more negative.

In mathematical terms, the following equation summarizes the function used to produce the result:

$$\text{Result}=a*\text{firstfunction}((\text{seed1})^x)\blacksquare b*(\text{secondfunction}((\text{seed2})^y)+c$$

Where $\blacksquare$ indicates one or more mathematical operations to perform the mathematical combination, a and b are the weights, x and y are the powers, and c is the constant (e.g., an integer or real number).

At operation 310, it can be determined whether the result is greater than, or equal to, a threshold. The threshold can be the same or different for different alterations or individuals. In some embodiments, the threshold can change based on an iteration number (the number of iterations performed). In some embodiments, the threshold can change based on how close the top N individuals are to satisfying the end condition (as determined at operation 208, see FIG. 2). In some embodiments, the closer the top N individuals are to satisfying the end condition, the higher the threshold can be set. The threshold can be set to control a rate of evolution of the population. A lower threshold can increase the rate of evolution while a higher threshold can decrease the rate of evolution.

In response to determining the result is greater than the threshold at operation 310, a genetic alteration can be performed at operation 312. The operation 312 is a subset of the operations performed at operation 204.

In response to determining the result is not greater than the threshold at operation 310, the first and second seed values can be updated at operation 314. Updating the first and second seed values can include adding an offset to the first value and the second value. The offset can be the same or different for each of the first and second seed values. In some embodiments, the offset can be determined using the first function or the second function. In some embodiments, the first seed can be input to the first function to determine a first offset and the second seed can be input to the second function to determine a second offset. The first offset can then be added to the first seed value to generate an updated first seed value. The second offset can then be added to the second seed value to generate an updated second seed value. In some embodiments, the inputs to the function that defines the offset can be raised to a power, similar to the power used to generate the intermediate value at operation 304, 306 in some embodiments. In mathematical terms the seed update is summarized as follows:

$$\text{Updated Seed}=a*\text{previous\_seed}\blacksquare b*\text{offset}+c$$

Where $\blacksquare$ indicates one or more mathematical operations to perform the mathematical combination, a and b are weights (same or different weights previously discussed), and c is a constant (same or different as that previously discussed). The updated seed values can then be used to determine a next result by iterating through method 300 starting at operation 304.

Returning to the ending condition used at operation 208, the ending condition can rely on predetermined machine learning (ML) metrics. Training an ML technique produces a form of data model. There are various metrics that can be determined regarding an ML technique. One or more of the metrics can be used as an end condition to be tested against. For example, an ML L2 classification accuracy (described further regarding FIGS. 4-6), an ML L1 classification accuracy (also described further regarding FIGS. 4-6), an ML input/output example label, or an ML input/output example confidence (sometimes called probability). Using these end conditions, the data model produced using the GEP technique can be guaranteed to operate at least as good as a corresponding ML technique, but require less memory and processing bandwidth.

Figure 4:
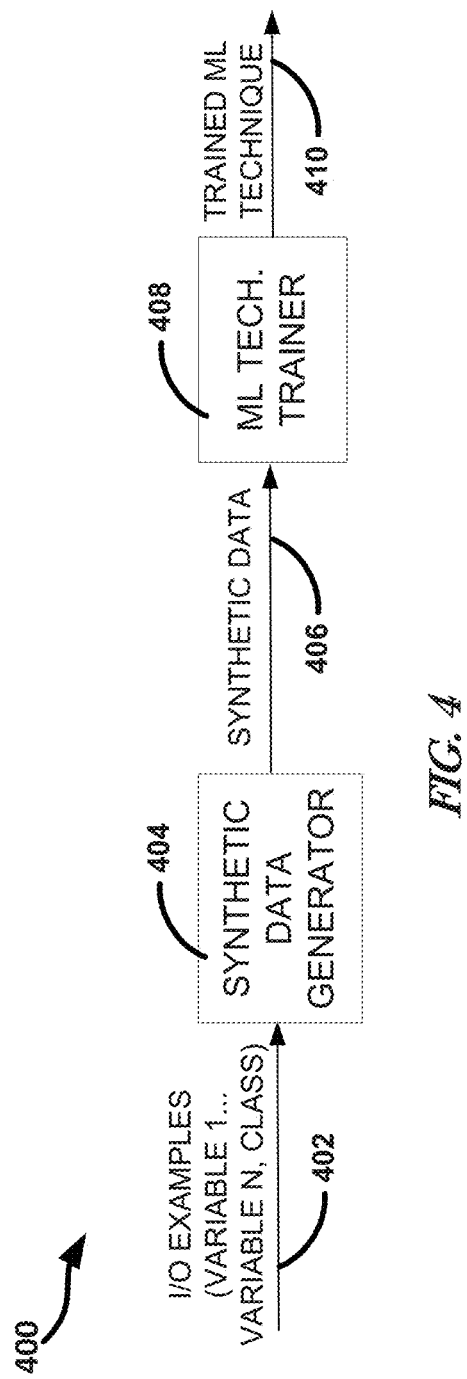
FIG. 4 illustrates, by way of example, a diagram of an embodiment of a system for synthetic data generation and ML training.

FIG. 4 illustrates, by way of example, a diagram of an embodiment of a system 400 for synthetic data generation and ML training. The system 400 as illustrated includes a synthetic data generator 404 and an ML technique trainer 408. The synthetic data generator 404 performs a Spatial Voting (SV) operation on I/O examples 402 and generates synthetic data 406 based on the I/O examples 402.

The I/O example 402 (sometimes called input/output examples) include input data and can optionally include a class to which the input data is a member. The input data can include variables that can be output from one or more processes or devices. The processes or devices can be any of a wide range of sensors, firewalls, network traffic monitors, bus sniffers, or the like. The processes or devices can provide variable data in a wide variety of formats, such as alphanumeric, character, strictly numeric, list of characters or numbers, strictly alphabet, or the like. Any non-numeric input can be converted to a numeric value as part of the SV operation (see FIGS. 9-12 for further details).

Figure 5:
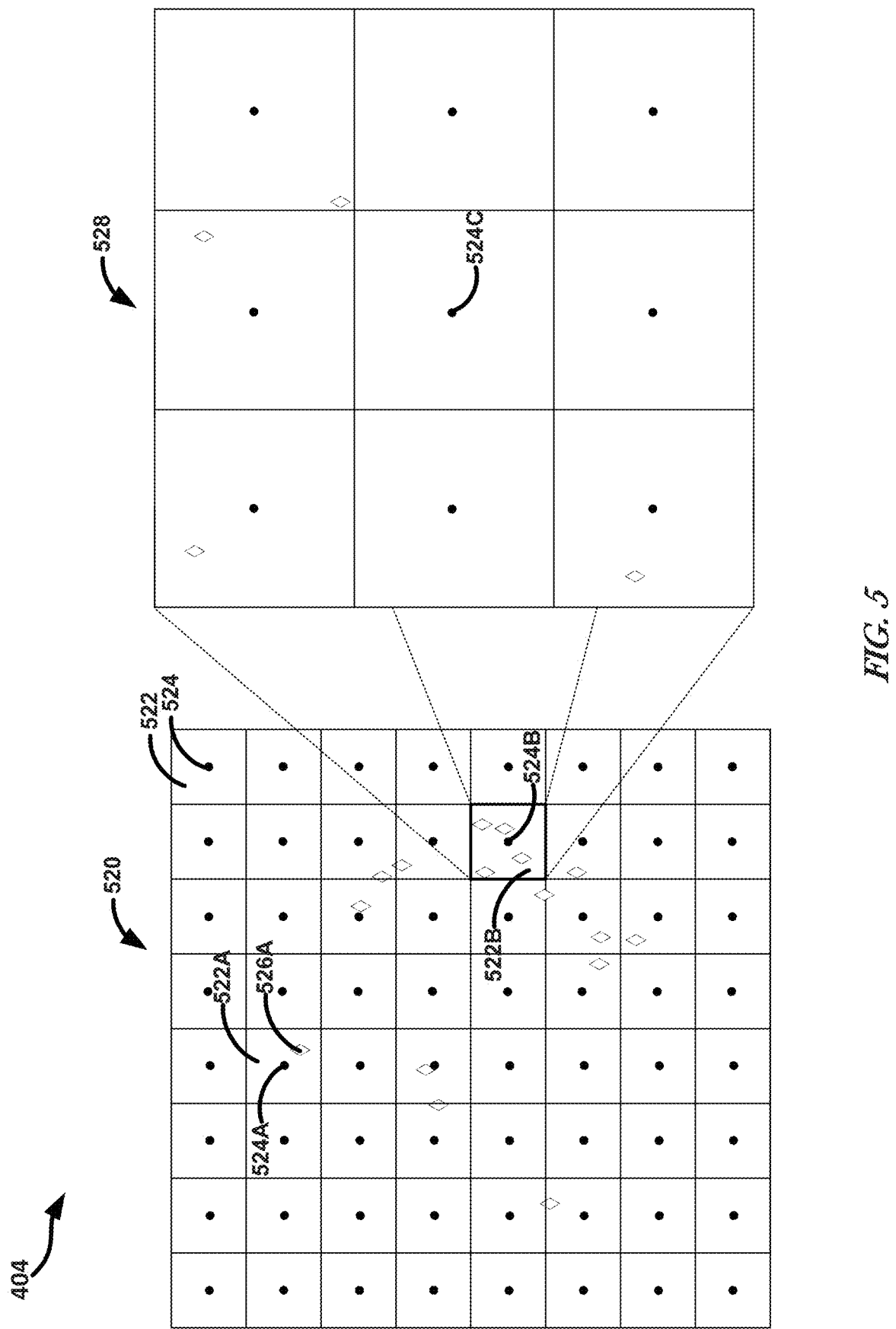
FIG. 5 illustrates, by way of example, a portion of a synthetic data generation process, such as can be performed by the SV data generator.

FIG. 5 illustrates, by way of example, a portion of a synthetic data generation process, such as can be performed by the SV data generator 404. The SV operation converts N-numeric values (feature vectors) to values of two features (same feature on different data or different features on same data) and maps the two features to an SV grid 520. The SV grid 520 includes cells 522 (of equal size and extent) each with a corresponding cell center 524. The cell center 524 can serve as a convenient reference point for the cell 522.

The diamonds 526 represent respective locations to which an I/O example 102 is mapped based on a determined feature. For more information regarding the types of features and other details of SV operations, please refer to FIGS. 9-12.

The synthetic data generator 404 performs the SV operations and generates the synthetic data 406. The synthetic data 404 can include, for each cell, an average of all features of data mapped thereto. For a cell that includes only a single I/O example 402 mapped thereto, the average is trivial and is just the value of the features (e.g., variables) of the I/O example represented by the diamond 526. For example, the cell 522A has only a single I/O example 102 mapped thereto, so the synthetic data 406 for the cell 522A is the value of the variables of that I/O example 402. The synthetic data 406 can then be associated with the center 524A of the cell.

The cell 522B includes multiple I/O examples mapped thereto. In such a case, the individual variables are averaged per variable, to determine a single value for each variable to be associated with the center of the cell 522B. Assume the I/O examples that map to the cell 522B have the following values (along with an optional class):

| I/O Example | variable 1 | variable 2 | variable 3 | variable 4 | variable 5 | variable 6 |
|---|---|---|---|---|---|---|
| 1 | value 1 | value 5 | value 9 | value 13 | value 17 | value 21 |
| 7 | value 2 | value 6 | value 10 | value 14 | value 18 | value 22 |
| 11 | value 3 | value 7 | value 11 | value 15 | value 19 | value 23 |
| 16 | value 4 | value 8 | value 12 | value 16 | value 20 | value 24 |

Note that six variables per I/O example 402 is merely an example, and more or fewer variables (e.g., features of a feature vector) can be used. The synthetic data value associated with the center 524B can be the average of each value of the variable so the value of the synthetic data 406 for the cell 522B in this example can be:

Synthetic Data=(Avg(value 1, value 2, value 3, value 4), Avg(value 5, value 6, value 7, value 8), Avg (value 9, value 10, value 11, value 12), Avg (value 13, value 14, value 15, value 16), Avg (value 17, value 18, value 19, value 20), Avg (value 21, value 22, value 23, value 24))

Avg can include the mean, expectation, median, mode, fusion of values, ensembling, lossy compression, or other average.

Like I/O examples 402 can be voted to a same or nearby cell. This is, at least in part because the SV operation has the ability to vote similar I/O examples to same or nearby cells. The synthetic data 406 generated at this point can be used as training data for an ML technique, such as by the ML technique trainer 408 to generate a trained ML classifier 410.

However, in some embodiments, the class of the I/O examples 402 can be important or the synthetic data 406 can be used in a specific process that requires more data analysis. In such embodiments, the mapped data (represented by the diamonds 526) can be further processed.

Consider again, the cell 522B and the four mapped data points. Also, assume that the respective classes associated with two or more of the four mapped data points are different. The cell 522B can be further divided further into a sub-grid 528. The number of cells in a row and column of the sub-grid 528 can be rounded up to the nearest odd integer, and determined by the following equation:

maximum(3, sqrt(number of points mapped to cell))

The centers 524B and 524C can correspond to the same point, while the remaining centers of the sub-grid 528 correspond to different points. The variables of I/O examples 402 mapped to a same cell 522 can be averaged (in the same manner as discussed previously) to generate the synthetic data 406 for that cell.

In the example of FIG. 5, all the cells of the grid 528 include only a single point mapped thereto, thus there is no class conflict and the process can end. However, further sub-dividing of the grid can be required in some examples to remove class conflicts.

The synthetic data 406 from the grid 520 is sometimes called L2 synthetic data and the synthetic data 406 from the grid 528 is sometimes called L1 synthetic data. In examples in which data mapped to a cell in the grid 528 includes disparate classes, the cell can be further subdivided until the data in each cell no longer includes a conflicting class designation. In such examples, the synthetic data from the final subdivided grid is considered L1 synthetic data and the synthetic data from the immediately prior grid is considered L2 synthetic data. The L1 and L2 synthetic data labels can be used to aid in determining an ending condition, such as to be used at operation 208.

Figure 6:
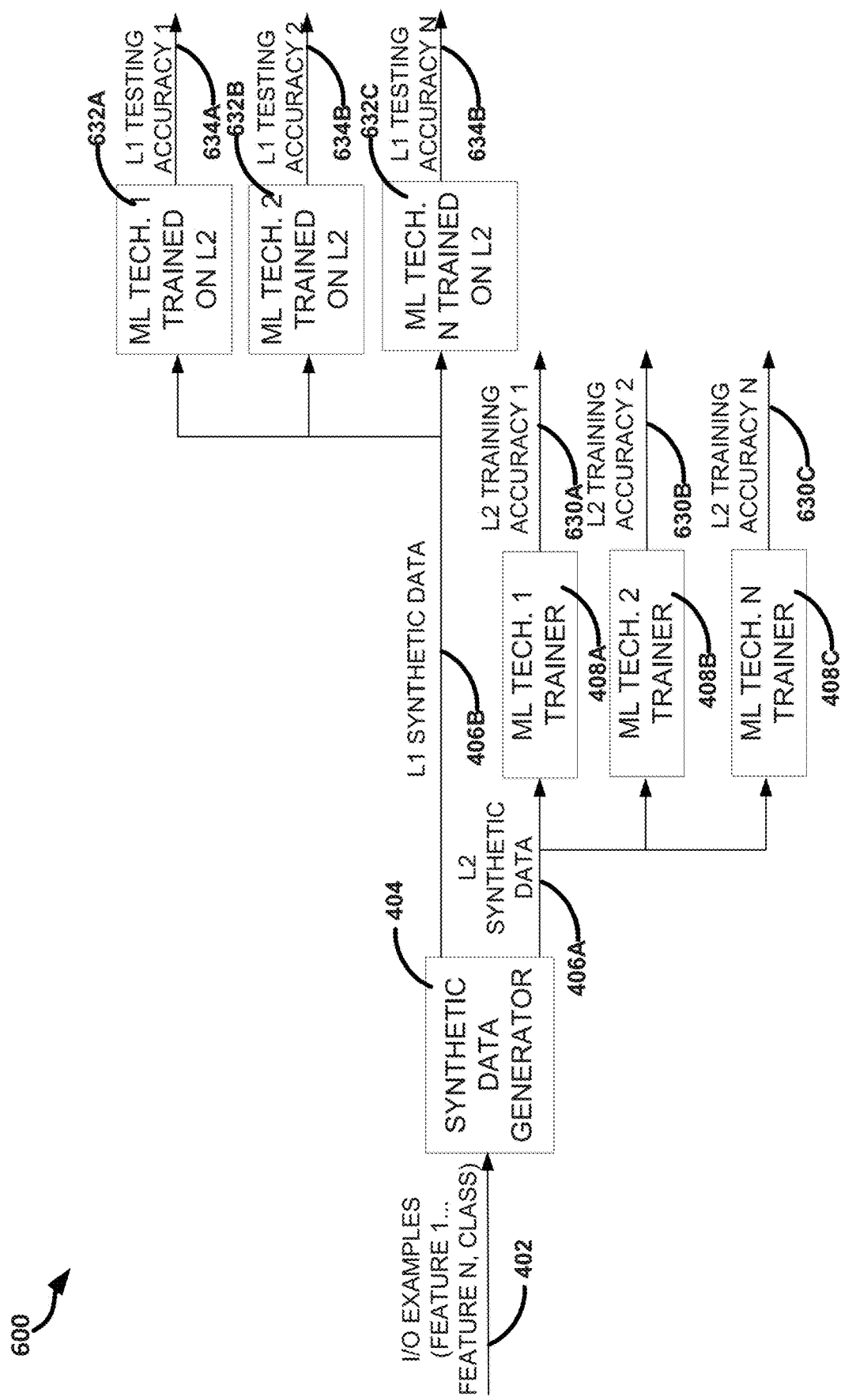
FIG. 6 illustrates, by way of example, a diagram of an embodiment of a portion of a system for characterizing an innate ability of an ML technique to classify accurately.

FIG. 6 illustrates, by way of example, a diagram of an embodiment of a portion of a system 600 for characterizing an innate ability of an ML technique to classify accurately. The system 600 includes the synthetic data generator 404, a plurality of ML technique trainers 408A, 408B, and 408C and a plurality of trained ML techniques 632A, 632B, 632C. The synthetic data generator 404 receives the I/O examples 402 and generates L1 synthetic data 406B and L2 synthetic data 406A. The L1 synthetic data 406B can be generated based on the grid 528, while the L2 synthetic data 406A can be generated based on the grid 520. As previously discussed, the L1 synthetic data 406A can alternatively be from a further sub-grid, such as in examples in which a cell of the grid 528 includes data mapped thereto with conflicting (non-equal) classes and the L2 synthetic data 406B can be from the immediately preceding sub-grid that includes at least one cell with data mapped thereto with conflicting classes.

The L2 synthetic data 406A can be used to train each of a plurality of ML techniques, such as by the ML technique trainers 408A-408C. Each of the ML techniques can be different versions of a same technique, different techniques, a combination thereof, or the like. The ML technique trainer 408A-408C can determine a training accuracy 630A, 630B, 630C for each of the trained techniques. The training accuracy 630 indicates how well the ML technique classified the L2 synthetic data 406A. The training accuracy 630 is an indication of the ability to explain the L2 data 406A.

In general, ML technique training includes learning parameters (sometimes called weights) that reduce a specified cost function based on training data. The training data includes a feature vector and a class. The ML technique trainer 408A-408C adjusts the parameters so that the trained ML technique 632A-632C identifies a correct class for the input data (L2 synthetic data 106A in the example of FIG. 6). By adjusting the parameters of the ML technique, different input feature vectors can be mapped to corresponding classes.

The L1 synthetic data 406B can be used to test each of the trained ML techniques 632A, 632B, 632C that were trained on the L2 synthetic data 406A. A testing accuracy 634A, 634B, 634C can be determined for each of the trained ML techniques 632A-632C. The testing accuracy is an indication of the ability of the trained ML techniques 632A-632C to generalize what they learned by being trained on the L2 synthetic data 406A to variations on the L2 synthetic data 406A that are present in the L1 synthetic data 406B.

The L1 synthetic data 406B and L2 synthetic data 406A can be a vector of the form (avg (variable 1), avg (variable 2) . . . , avg (variable N), class), where N is any positive integer greater than 1. The L1 synthetic data 406B and the L2 synthetic data 406A can optionally include a value corresponding to a center of an associated cell, or the avg can be determined further based on the value of the center of the cell. The value of the center of the cell is (feature 1, feature 2). L1 synthetic data 406B can be a bigger data set than the L2 synthetic data 406A, as some of the points that were averaged to generate the L2 synthetic data may be mapped to different cells (e.g., sub-cells) in the L1 synthetic data 406B.

Figure 7:
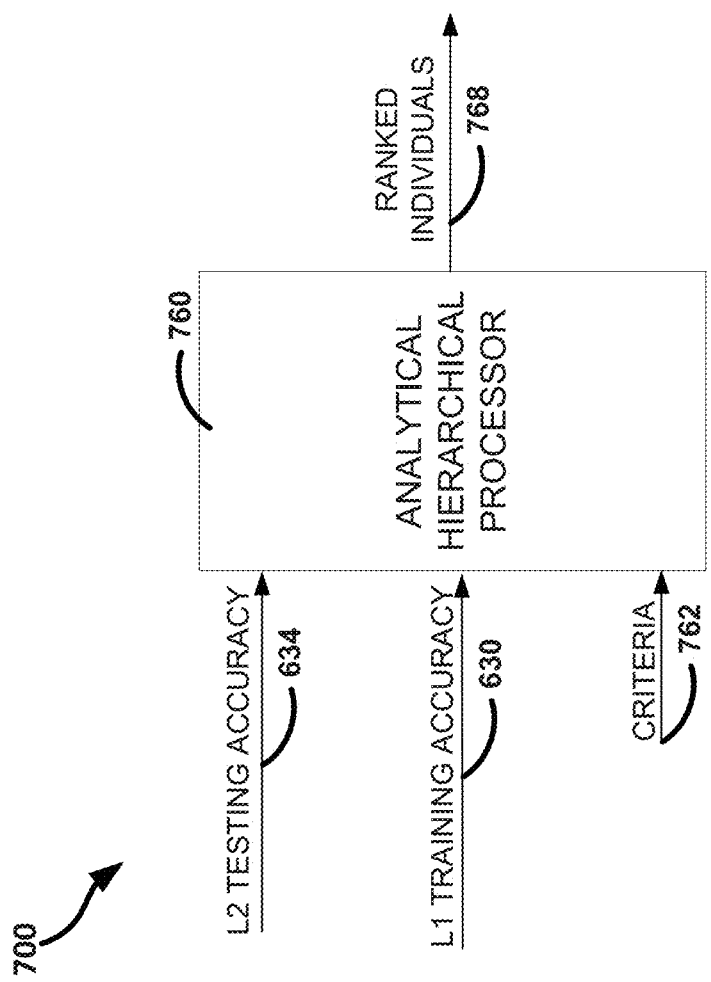
FIG. 7 illustrates, by way of example, a diagram of an embodiment of a portion of a process for ranking individuals for a GEP data model.

FIG. 7 illustrates, by way of example, a diagram of an embodiment of a portion of a process 700 for ranking individuals for a GEP data model. The process 700 can include using an analytical hierarchical processor (AHP) 760 to generate a ranked list of the individuals 768. The AHP 760 can determine the ranked individuals 768 based on the testing accuracy 634, the training accuracy 630, the value corresponding to the training accuracy divided by the testing accuracy, or other criteria 662 such as computational resource requirements, function order (a highest power used in the function), length (size) or complexity of exported classifiers, an accuracy of a classification label produced by the individual, a confidence of a classification label produced by the individual, or the like. In general, the criteria can include any criteria external to the use case and its representative I/O examples, as long as measurable numeric characteristics of such criteria exist.

Figure 8:
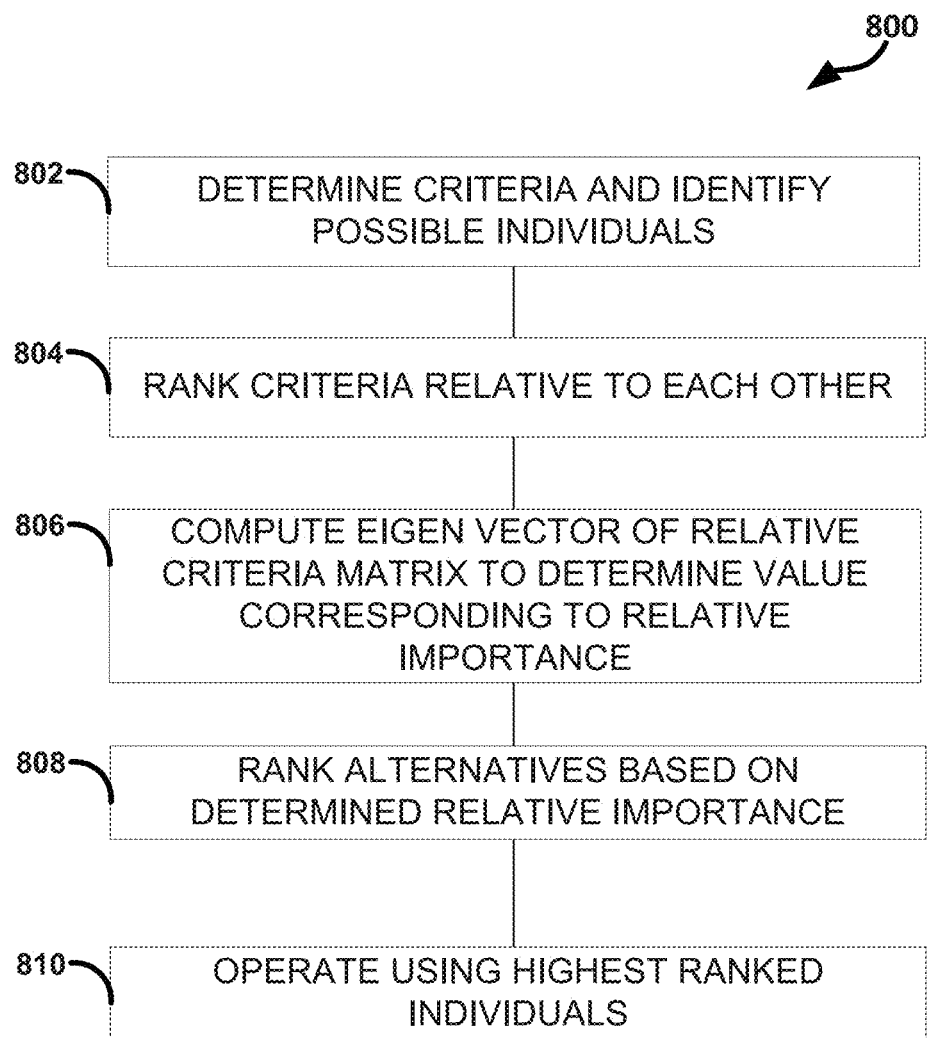
FIG. 8 illustrates, by way of example, a diagram of an embodiment of a method for ranking individuals.

FIG. 8 illustrates, by way of example, a diagram of an embodiment of a method 800 for ranking individuals 632. The method 800 can be performed by the AHP 760. The method 800 as illustrated includes determining an objective and criteria and identify possible individuals to satisfy the objective, at operation 802; ranking the criteria relative to each other, at operation 804; computing an Eigen vector of a relative criteria matrix to determine a value corresponding to the relative importance for each criteria, at operation 806; arranging the ML techniques based on the determined relative importance, at operation 808; and operating using the highest ranked ML technique, at operation 810.

An objective of the process 800 can be to identify the best ML technique to use to classify an input. The criteria determined at operation 802 can include the testing accuracy 634, the training accuracy 630, the value corresponding to the training accuracy divided by the testing accuracy, or other criteria 762. The user of the process 800 can indicate, at operation 804, a relative importance of the criteria determined at operation 802. For example, a specific example can include a user attempting to implement a classifier on an embedded device with limited processor or memory resources available to implement the data model. In such an example, the size of exported classifier can be important. In another example, an accuracy of the label generated by the model can be most important. To indicate this, the user can rank the criteria relative to other criteria. To indicate that one criterion is more important, the user can associate a larger relative value with that criteria and a lower relative value with other criteria. To indicate that criterion is of same importance, the user can associate a same value with each of the criterion at operation 804. To indicate that criterion is of lower importance, the user can associate a lower relative value with the criterion than another criterion.

The operation 804 can include generating a matrix to quantify the relative importance of the criteria. The matrix can be setup as follows:

$$\begin{matrix} 1 & 1/a & 1/b & 1/c \\ a & 1 & 1/d & 1/e \\ b & d & 1 & 1/f \\ c & e & f & 1 \end{matrix}$$

where a is the importance of criteria 2 relative to criteria 1, b is the importance of criteria 3 relative to criteria 1, c is the importance of criteria 4 relative to criteria 1, d is the importance of criteria 3 relative to criteria 2, e is the importance of criteria 4 relative to criteria 2, and f is the importance of criteria 4 relative to criteria 3. The diagonal is all "1" as it reflects an importance of criteria relative to itself. The values of the Eigen vector can provide weights to apply to the values of the criteria for each ML technique 632A-632C.

The operation 808 can include determining a weighted sum of the criteria for each trained ML technique 632A-632C. The weighting can include using a value (e.g., normalized value) of the Eigen vector associated with the criteria. The operation 808 can include assembling the trained ML techniques 632A-632C in order of the determined value (ascending or descending order). Only the top ranked, trained ML techniques 632A-632C can be used in further processing in some embodiments.

A trained ML technique 632A-632C deployed on a device can be considered a sensor. The device can receive input and operate on the input using the trained ML technique 632A-632C to detect whether the input falls within a specified class. The device thus senses whether input associated with the class is present. The AHP 760 can provide data indicating a state estimate for the sensor.

Figure 9:
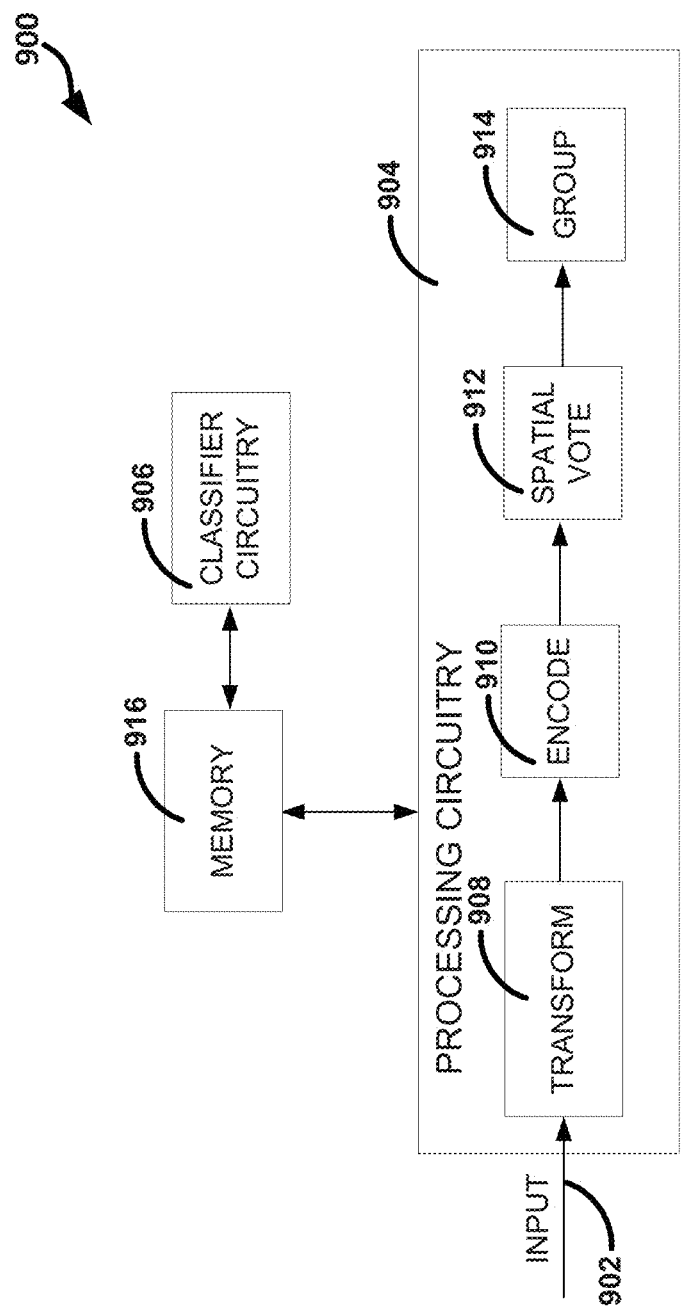
FIG. 9 illustrates, by way of example, a diagram of an embodiment of a system for anomaly detection.

FIG. 9 illustrates, by way of example, a diagram of an embodiment of a system 900 for anomaly detection. The system 900 as illustrated includes processing circuitry 904, classifier circuitry 906, and a memory 916. The processing circuitry 904 can identify an anomaly (a behavior that has not been seen by the processing circuitry 904 up to the point the behavior is seen). The classifier circuitry 906 can present the anomaly to a user for action, adjust SV grid parameters, or the like. The memory 916 can store key values, SV grid parameters, or other data input or output from the processing circuitry 904.

The processing circuitry 904 receives input 902. The input 902 can include binary data, text, signal values, image values, or other data that can be transformed to a number. The processing circuitry 904 can transform the input 902 to a number, at operation 908. The operation 908 can include encoding the input into a specified format, parsing the data into chunks (e.g., chunks of a specified size), or the like. For example, the operation 908 can include encoding text input to an American Standard Code for Information Interchange (ASCII) encoding to transform the input 902 into numbers between zero (0) and two hundred fifty-five (255). In another example, the operation 908 can include converting chunks of binary data to their numerical equivalent, such as two's complement, unsigned integer, floating number (e.g., short or long), or the like. In yet another example, the operation 908 can include performing an analog to digital conversion on analog signal data, such as by an analog to digital converter. In yet another example, the operation 908 can include combining red, green, blue (RGB) values of a color image, or the like, to generate a number. Not all input 902 needs to be transformed, thus the operation 908 is optional.

The processing circuitry 904 can receive numbers either as raw input 902 or from the operation 908 and encode the numbers into two features (discussed below) at operation 910. The operation 910 is order-sensitive, such that the same inputs received in a different order encode (likely encode) to different features.

Examples of features include RM, RS, SM, SS, TM, TS, OC1, OC2, and OCR (discussed below). These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for i=1, 2 . . . n.

RS can be determined using Equation 2:

$$RS_i = \left(RS_{i-1} + \sqrt{\frac{(X_i - RM_i)^2}{2}}\right)/2 \qquad \text{Equation 2}$$

SM can be determined using Equation 3:

$$SM_i = \Sigma X_i/n \qquad \text{Equation 3}$$

SS can be determined using Equation 4:

$$SS_i = \sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left(TS_{i-1} + \sqrt{\frac{(X_i - TM_i)^2}{2}}\right)/2 \qquad \text{Equation 6}$$

Orthogonal component 1 (OC1) can be determined using Equation 7:

$$OC1_i = (RM_i + SM_i + TM_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = OC1_i + OC2_i \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups, but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45-degree line, then the 2 chosen stat types are highly correlated and are describing the same aspects of the data. When this occurs, it is generally suggested that one of the compressive encoding features be changed to a different one.

T-type feature—These compressive encoding features are sensitive to all changes and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 and OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same features can be used on different data. For example, TS on a subset of columns of data from a row in a comma separated values (CSV) data file can form a feature 1, while TS on the same row of data but using a different subset of columns can form a feature 2.

In some embodiments, one or more features can be determined based on length of a corresponding data item. The length-based features are sometimes called LRM, LRS, LSM, LSS, etc.

The features of Equations 1-9 are order-dependent. The features can be plotted against each other on a grid of cells, at operation 912. The processing circuitry 904 can initialize an SV grid to which the encoded inputs are mapped, such as at operation 912.

Plotted values can be associated or correlated, such as at operation 914. The operation 914 can include forming groups of mapped inputs and determining an extent thereof. More details regarding the operations 908-914 are provided in FIGS. 10-12.

The classifier circuitry 906 can provide a user with a report indicating behavior that is anomalous. An input mapped to a cell that was not previously populated is considered anomalous. If an input is mapped to a cell that already has an input mapped thereto by the features, the input can be considered recognized or known. Since some applications can be memory limited, an entity can opt to have few cells in an SV grid. For these cases, it can be beneficial to determine an extent that an encoded value is situated away from a center of a cell. If the encoded value is a specified distance away from the center or a center point (e.g., as defined by a standard deviation, variance, confidence ellipse, or the like), the corresponding data item can be considered anomalous. Such embodiments allow for anomaly detection in more memory-limited devices.

The classifier circuitry 906, in some embodiments, can indicate in the report that an input known to be malicious was received. The report can include the input, the group (if applicable) to which the cell is a member, a number of consecutive inputs, a last non-anomalous data item, a subsequent non-anomalous data-item, such as for behavioral analysis or training, or the like. The classifier circuitry 906 can indicate, in the report, different types of anomalies. For example, a type 1 anomaly can indicate a new behavior that falls within an area of regard (AOR). A type 2 anomaly can indicate a new behavior that falls outside of an area of regard. An area of regard can be determined based on one or more prior anomaly detection epochs. In a given epoch, there can be one or more areas of regard. An anomaly detection epoch is a user-defined interval of analyzing a number of inputs, a time range, or the like. The epoch can be defined in the memory 816 and monitored by the processing circuitry 904.

In some embodiments, an event for the report can include a single anomalous behavior. In some embodiments, an event for the report can be reported in response to a specified threshold number of type 2 anomalies.

The classifier circuitry 906 can adjust SV grid parameters. An initial size of an SV grid cell can be determined. In some embodiments, the initial size of the SV grid cell can include dividing the space between (0, 0) and the encoded (x, y) of the first input data item into an N×N SV grid, where N is the initial number of cells on a side of the SV grid (for example, a 16×16 SV grid would break up the distance in x and in y to the first data point from the origin into 16 equal divisions).

As new input data items are introduced and encoded, whenever one fall outside the extent of the SV grid, the N×N SV grid can be increased in size to (N+1)×(N+1) until either the new input data item is included on the resized SV grid, or N becomes equal to the maximum allowed number of SV grid cells on a side of the SV grid. After N becomes a defined maximum SV grid size (for example 64×64), and a new input data item falls off of the current SV grid, the size of each SV grid cell size can be increased so that the SV grid encompasses the new data point.

As either the number of SV grid cells on a side or the overall extent of the SV grid in x and y are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This can be done using the following equations:

$$\text{Row} = int(\text{Key Value}/(\text{number of cells on side})) \quad \text{Equation 10}$$

$$\text{Col} = \text{Key Value} - int(\text{Row}*(\text{number of cells on side})) \quad \text{Equation 11}$$

$$\text{Center 1} = x\ min + \text{Col}*(x\ \text{range})/(\text{num. col}-1) \quad \text{Equation 12}$$

$$\text{Center 2} = y\ min + \text{Row}*(y\ \text{range})/(\text{num. row}-1) \quad \text{Equation 13}$$

The values for Center 1 and Center 2 can then be used in Equations 14, 15, and 16 (below) as Feature 1 and Feature 2 to calculate the new Key Value for each populated cell on the new SV grid.

Figure 10:
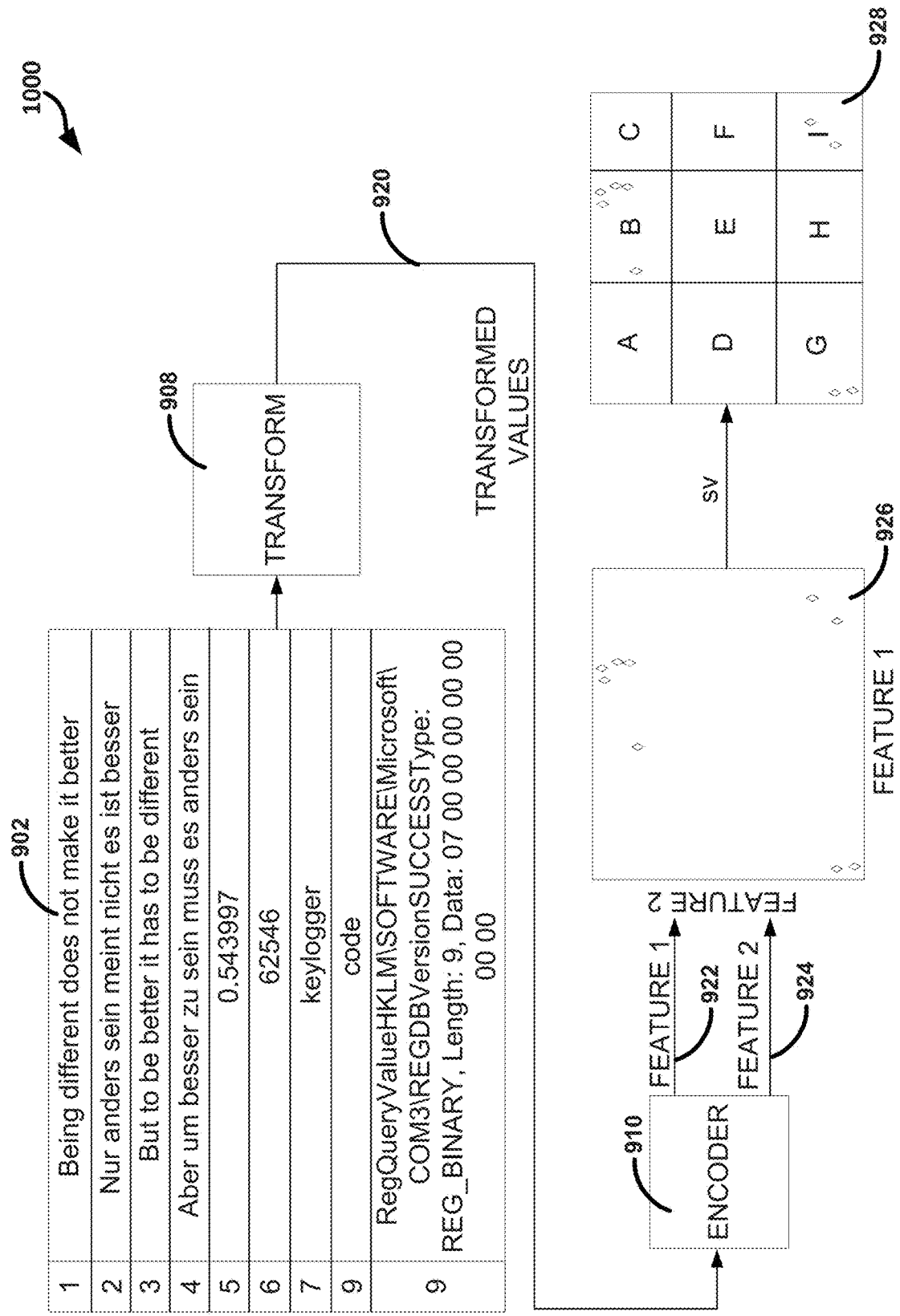
FIG. 10 illustrates, by way of example, a diagram of an embodiment of a method for identifying an anomalous behavior.

FIG. 10 illustrates, by way of example, a diagram of an embodiment of a method 1000 for identifying an anomalous behavior. The method 1000 as illustrated includes receiving the input 902. The input 902 in FIG. 10 includes nine text strings labelled "1"-"9". Each of the text strings "1"-"9" of the input 902 is respectively transformed to transformed values 920 at operation 908. An example transformation is ASCII encoding which transforms text to numerical values. The transformed values 920 can be used to perform the operation 910. The operation 910 can include determining two features 922, 924 of the input 902 and plotting them against each other to form a feature graph 926. The features 922, 924 can include, for example, RM, RS, SM, SS, TM, and TS, in some embodiments.

Consider the input data item "1". Each character of the input data item "1" can be transformed to an ASCII value. The features can be determined based on the ASCII encoding of the entire string. That is, $X_i$, is the ASCII value of each character and the features are determined over all ASCII encodings of the characters of the input data item "1". As an example, the resultant RM can be feature 1 922 and the resultant RS can be feature 2 924, or vice versa. This is merely an example and any order-dependent feature can be chosen for feature 1 and any order-dependent feature chosen for feature 2. Each of the input data items "1"-"9" can be processed in this manner at operation 908 and 910.

The graph 926 can then be split into cells to form a grid 928. The cells of FIG. 10 are labelled "A"-"I" for illustration (Key Values are numeric labels of the SV grid cells from Equation 16). Inputs 902 mapped to a same cell can be considered similar. Inputs 902 mapped to an empty cell can be considered anomalous. In the grid 928, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent input data item 902 were to be received and mapped to cell "A", "C", "D", "E", "F", or "H" it can be deemed anomalous, as it is a behavior that has not been received before and is sufficiently different from other behaviors that have been seen previously.

As can be seen, whether an input is considered an anomaly is dependent on a size of a cell. The size of the cell can be chosen or configured according to an operational constraint, such as a size of a memory, compute bandwidth, or the like. The size of a cell can be chosen or configured according to a desired level of security. For example, a higher level of security can include more cells, but require more memory and compute bandwidth to operate, while a lower level of security can include fewer cells but require less memory and bandwidth to operate.

Figure 11:
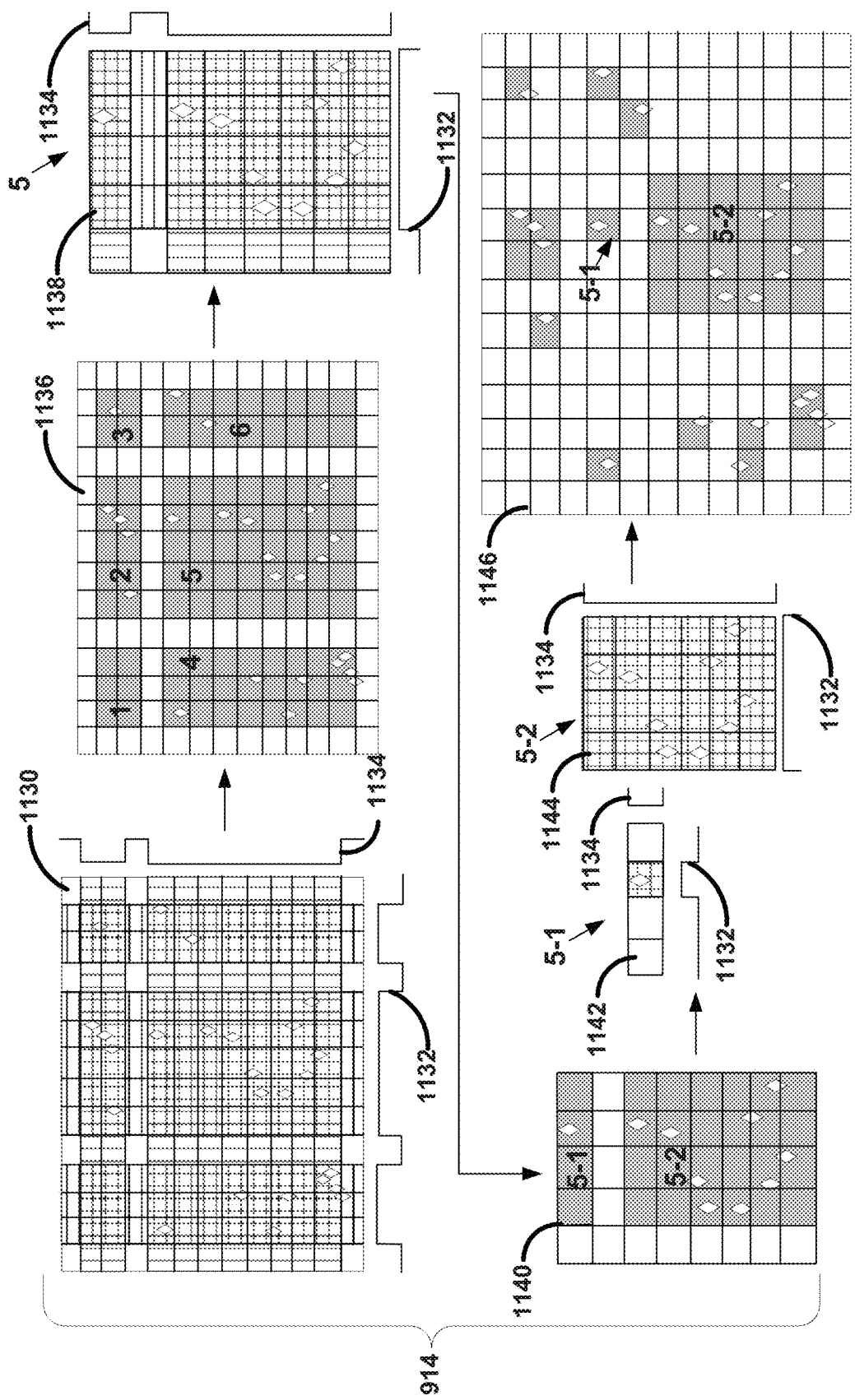
FIG. 11 illustrates, by way of example, a diagram of an embodiment of a grouping operation.

FIG. 11 illustrates, by way of example, a diagram of an embodiment of the operation 914. Encoded inputs ((x, y) points) are represented by diamonds. The operation 914 (sometimes called shadowing for group extraction) can include an iterative process that identifies cells that are populated and aggregates and separates those cells into groups. The iterative process can include:

1) Identifying cells of columns with at least one populated cell at operation 1132 (indicated by horizontal hashing in graph 1130)
2) Identifying cells of rows with at least one populated cell at operation 1134 (indicated by vertical hashing in graph 1130)
3) For each cell identified at both (1) and (2) (indicated by cross-hashing in the cell), (a) aggregate with all contiguous cells identified at both (1) and (2), (b) assign aggregated cells to a group, and (c) label the group with a key
4) Repeat (1)-(3) for each group/sub-group until no change.

A graph 1136 illustrates the result of a first iteration of performing the operations (1)-(3). After the first iteration, six groups "1"-"6" in FIG. 11 are formed. Next each of the groups "1"-"6" are processed by operations (1)-(3). In FIG. 11, the second iteration is illustrated for group "5". The operations 1132 and 1134 can be performed on a sub-grid 1138 formed by the cells of group "5". A graph 1140 illustrates the result of the second iteration of performing the operations (1)-(3). After a second iteration on group "5", two sub-groups "5-1" and "5-2" are formed in the example of FIG. 11.

In the example of FIG. 11, a third iteration of the operations (1)-(3) is performed on the subgroups "5-1" and "5-2". The operations 1132 and 1134 can be performed on sub-grids 1142, 1144 formed by the cells of sub-groups "5-1" and "5-2". A graph 1146 illustrates the result of the performing all iterations of the operations (1)-(3) and the groups formed therefrom.

In some embodiments, the number of cells can be adaptive, such as to be adjusted during runtime as previously discussed. Related to this adaptive cell size is determining the location of an encoded input in the grid and a corresponding key value associated with the encoded input. An example of determining the location in the grid includes using the following equations (for an embodiment in which feature 1 is plotted on the x-axis and feature 2 is plotted on the y-axis):

$$\text{Col} = \text{int}((\text{feature } 1 - x \text{ min}) * (\text{num. col} - 1) / (x \text{ range})) \quad \text{Equation 14}$$

$$\text{Row} = \text{int}((\text{feature } 2 - y \text{ min}) * (\text{num. row} - 1) / (y \text{ range})) \quad \text{Equation 15}$$

An encoding on the grid, sometimes called key value, can be determined using Equation 16:

$$\text{Key Value} = \text{num. row} * \text{Row} + \text{Col} \quad \text{Equation 16}$$

The "x min", "y min", "x max", and "y max" can be stored in the memory 916. Other values that can be stored in the memory 916 and relating to the grid of cells include "max grid size", "min grid size", or the like. These values can be used by the processing circuitry 904 to determine "x range", "num. col.", "y range", or "num. row", such as to assemble the grid of cells or determine a key value for a given encoded input (e.g., (feature 1, feature 2)).

A series of key values representing sequential inputs can be stored in the memory 916 and used by the classifier circuitry 906, such as to detect malicious (not necessarily anomalous) behavior. A malicious or other behavior of interest can be operated on by the processing circuitry 904 and the key values of the behavior can be recorded. The key values can be stored and associated with the malicious behavior. Key values subsequently generated by the processing circuitry 904 can be compared to the key values associated with the malicious behavior to detect the malicious behavior in the future.

Figure 12:
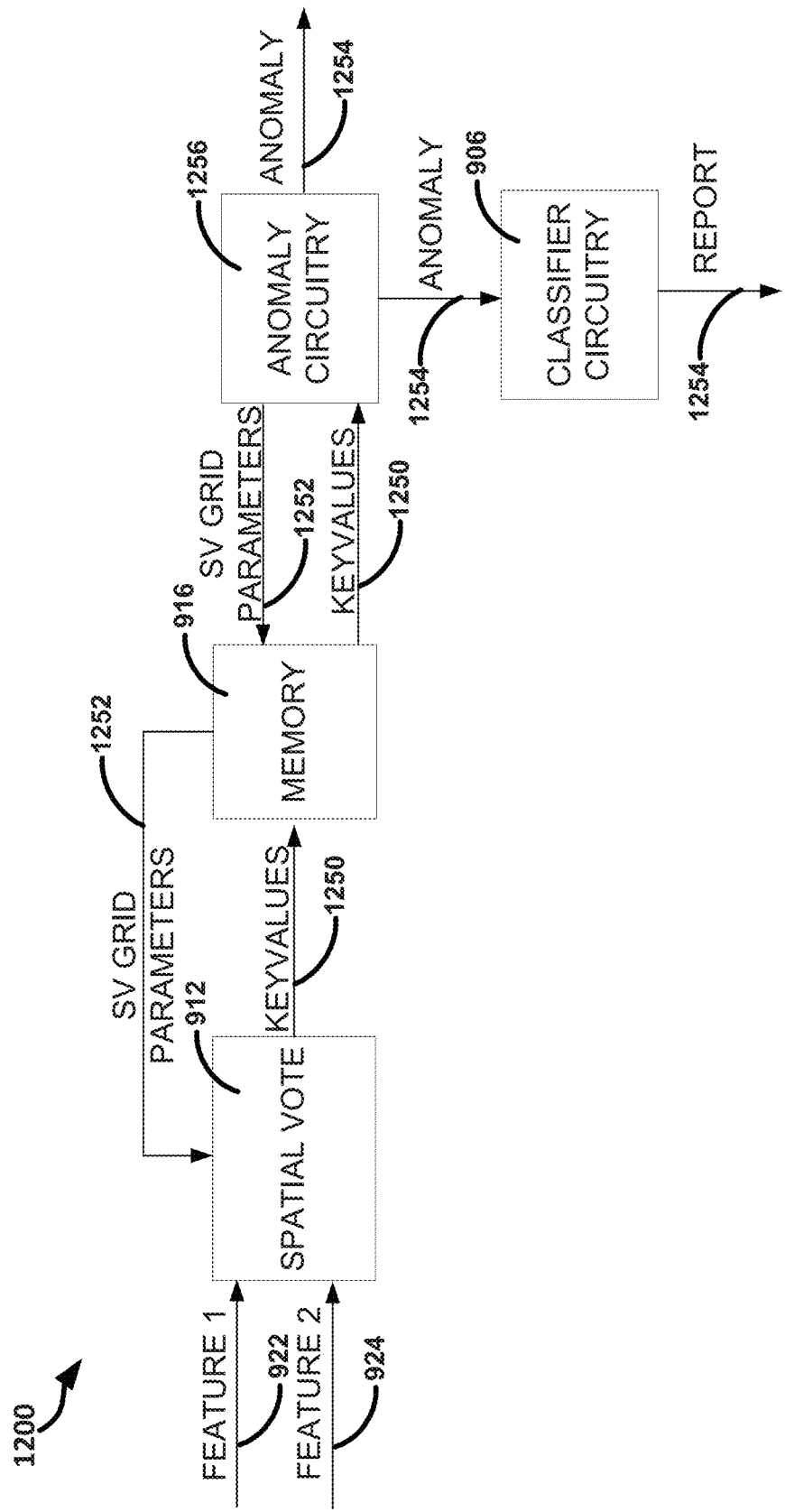
FIG. 12 illustrates, by way of example, a diagram of an embodiment of a system for anomaly detection.

FIG. 12 illustrates, by way of example, a diagram of an embodiment of a system 1200 for anomaly detection. The system 1200 includes an exploded view diagram of a portion of the system 900. The system 1200 as illustrated includes the operation 912 of the processing circuitry 904, the memory 916, the classifier circuitry 906, and anomaly circuitry 1256. The operation 912 determines key values 1250 based on SV grid parameters 1252 from the memory 916 and features 922, 924 determined by the processing circuitry 904. The anomaly circuitry 1256 can provide data indicating inputs mapped to a behavior never seen before (e.g., data mapped to a cell that was not populated previously).

The key values in the memory 916 can allow for F-testing, t-testing, or Z-score analysis, such as by the classifier circuitry 906. These analyses can help identify significant columns and cells. The classifier circuitry 906 can provide event and pre-event logs in a report 1254, such as for further analysis. The report 1254 can provide information on which column or cell corresponds to the most different behavior.

In some cases, it is desirable to have a fully differentiable equation that represents the data. Such differentiable equations are useful for modeling dynamical systems such as those that are based on coupled measurement sets or those which change as a function of one or more of the input variables.

The Turlington function is defined in Equation 17, where d is a fitting parameter, for example, d=0.001, and N is the number of data points:

$$\text{Turlington}(x) = y_1 + \frac{y_2 - y_1}{x_2 - x_1} * (x - x_1) + \sum_{j=2}^{N-1} d\left(\frac{y_{j+1} - y_j}{x_{j+1} - x_j} - \frac{y_j - y_{j-1}}{x_j - x_{j-1}}\right) \log_{10}\left(1 + 10^{\frac{x - x_j}{d}}\right) \quad \text{Equation 17}$$

Equation 18 defines the first derivative of the Turlington function, which is referred to as the first order Handley differential operator and is given by:

$$d\text{Handley}/dx = \frac{y_2 - y_1}{x_2 - x_1} + \sum_{j=2}^{N-1}\left(\frac{y_{j+1} - y_j}{x_{j+1} - x_j} - \frac{y_j - y_{j-1}}{x_j - x_{j-1}}\right)\left(10^{\frac{x - x_j}{d}} / \left(1 + 10^{\frac{x - x_j}{d}}\right)\right) \quad \text{Equation 18}$$

Equation 19 defines the $n^{th}$ order Handley differential operator, where n is a positive integer and is given by:

$$d^n Handley/dx^n = B(n) + \sum_{j=2}^{N-1} \sum_{i=1}^{n} \frac{(-1)^{i+1}}{d^{n-1}} \left( \frac{y_{j+1} - y_j}{x_{j+1} - x_j} - \frac{y_j - y_{j-1}}{x_j - x_{j-1}} \right)$$

$$\left( 10^{\frac{x-x_j}{d}} / \left(1 + 10^{\frac{x-x_j}{d}}\right) \right) \ln(10)^{n-1} \Psi_{n,i}$$

Equation 19

In Equation 19, the following apply:

$$B(1) = \frac{y_2 - y_1}{x_2 - x_1}, B(n) = 0 \text{ if } n > 1 \Psi_{n,i} = \sum_{\substack{j=i-1 \\ j \neq 0 \\ j \neq n}}^{i} j\Psi_{n,i}$$

So, if one constructs the Handley differential operator of the data using the $2^{nd}$ derivative form (n=2), one can automatically obtain the analytical integral of the data by setting n=1, or the analytical $j^{th}$ order derivative of the data by setting n=j+2.

To pre-initialize, one assumes the first two points occur at x=-1 and x=0 with y values of 0 respectively, and pre-calculate the initial Handley differential operator term and hardwire it as a starting term enabling the first live data point to generate the first new derivative term shown in Equation 19.

For some embedded applications, the natural log (ln) term can be replaced with its Taylor series expansion.

Figure 13:
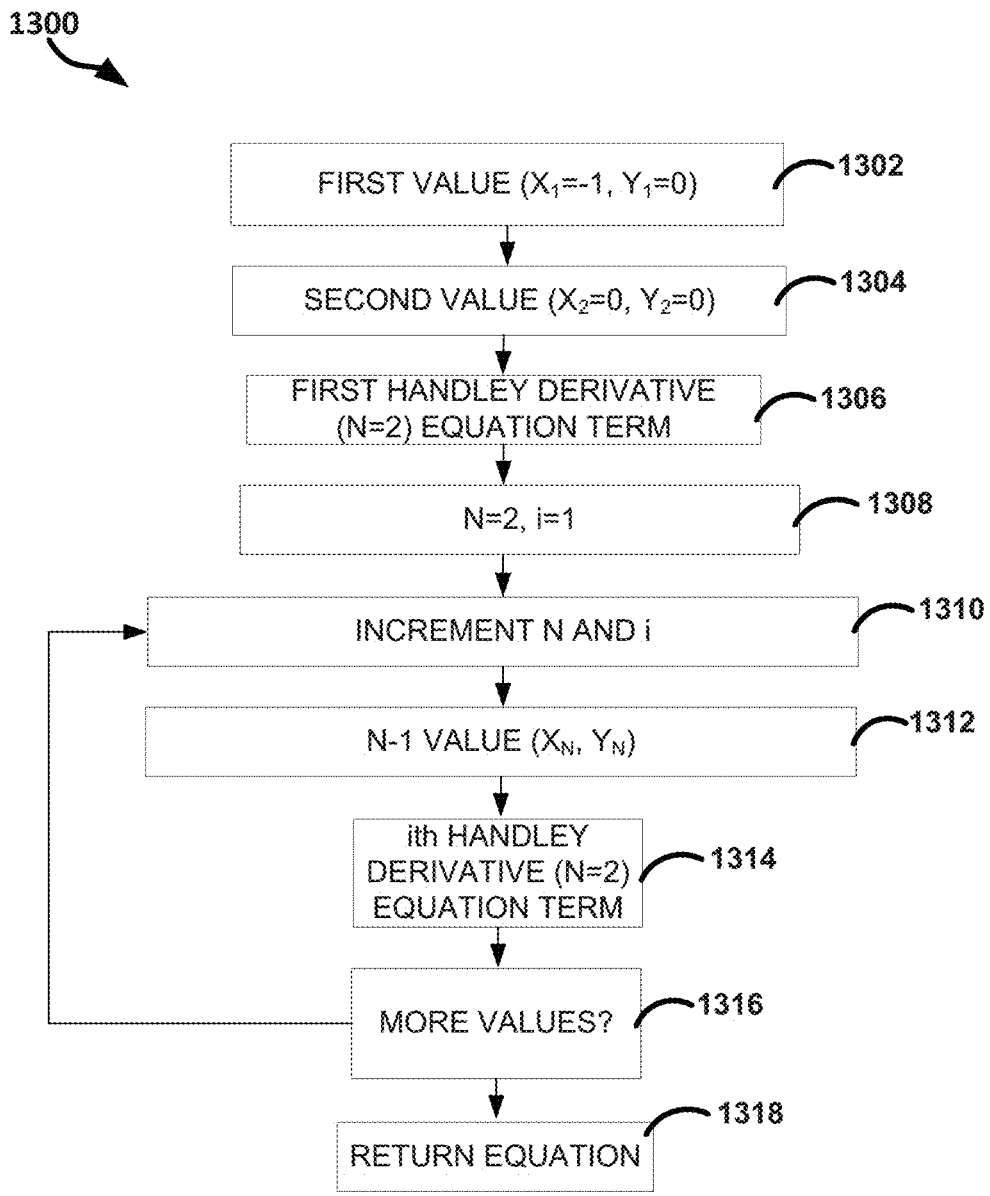
FIG. 13 illustrates a flow chart of a method for generating the Handley polynomial, such as can be used for behavior monitoring.

FIG. 13 illustrates a flow chart of a method 1300 for generating the Handley differential operator, such as can be used for behavior monitoring. The method 1300 can be implemented at one or more computing machines, for example, the computing machine 1500.

At operation 1302, upon receiving a set of measurements associated with actual device behavior, the computing machine sets the first value ($x_1$=-1, $y_1$=0). At operation 1304, the computing machine sets the second value ($x_2$=0, $y_2$=0).

At operation 1306, the computing machine computes the first Handley derivative (n=2) equation term. At operation 1308, the computing machine sets N=2 and i=1.

At operation 1310, the computing machine increases N by 1 and increases i by 1. At operation 1312, the computing machine computes the N−1 value ($x_N$, $y_N$).

At operation 1314, the computing machine computes, based on the computed Handley differential operator equation terms and the received set of measurements, the $i^{th}$ Handley derivative (n=2) equation term. At operation 1316, the computing machine determines if more values are to be computed. If more values are to be computed, the method 1300 returns to operation 1310. If no more values are to be computed, the method 1300 continues to operation 1318.

At operation 1318, upon determining that no more measurements are available, the computing machine outputs the final equation form, which is an equation based on the computed values. After operation 1318, the method 1300 ends.

Figure 14:
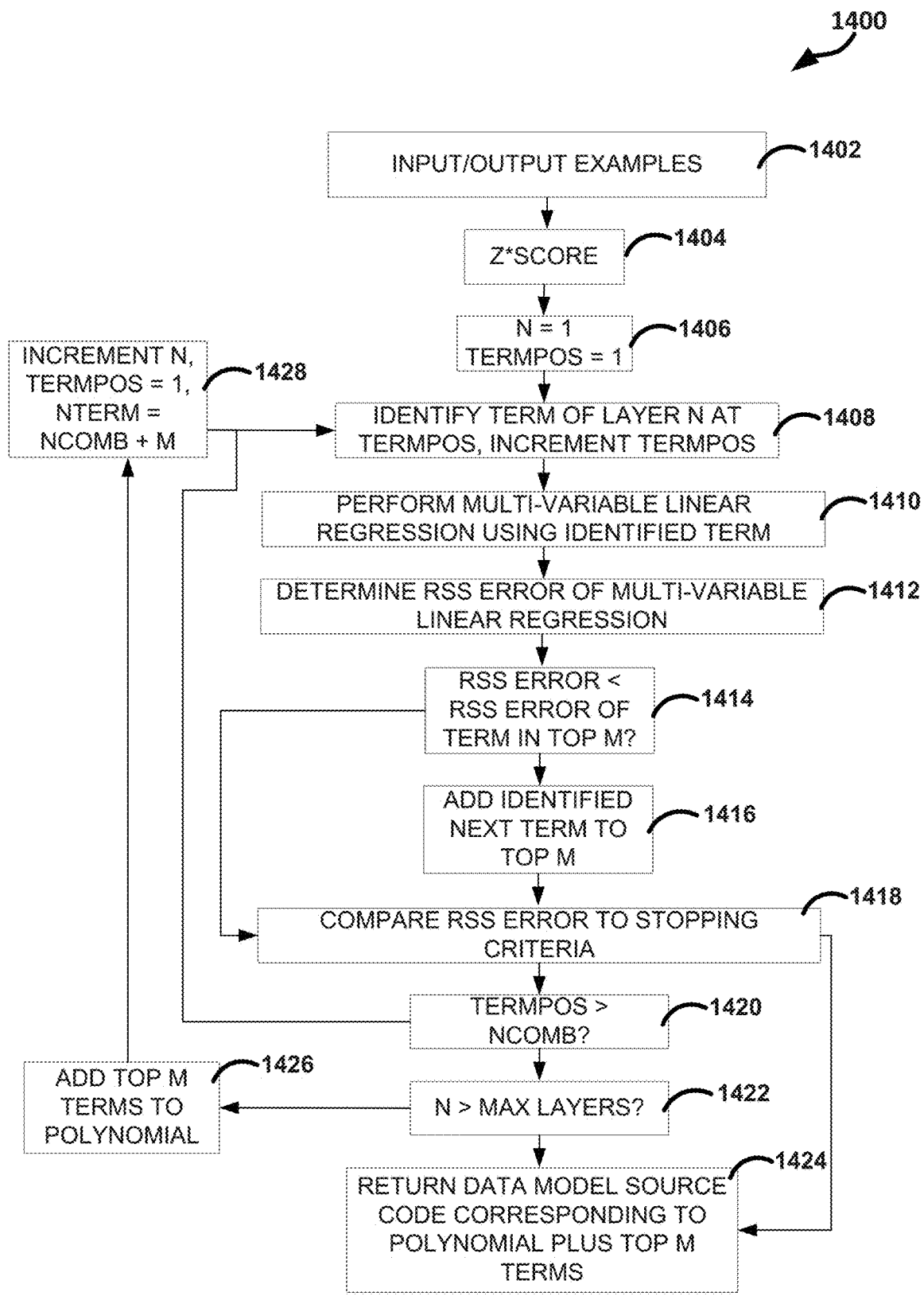
FIG. 14 illustrates, by way of example, a diagram of an embodiment of a method of Data Modeling.

In some aspects, the model determined using a complete polynomial can be more accurate than using a truncated function. The GEP models are generally truncated functions (not complete polynomials in the strict sense). However, the complete polynomial solutions can be prohibitively complex to implement and functions or operators that are non-linear can be more efficient to implement in a model than the complete polynomial. The GEP functions generated using the GEP techniques discussed herein can be used as input to a different data modeling technique that relies on current best estimators to generate better estimators (better models). FIG. 14 illustrates such a process that can benefit from using the top N individuals to further generate better estimators.

FIG. 14 is a flow chart for a method 1400 of Data Modeling, in accordance with some embodiments. The method 1400 is implemented at one or more computing machines, for example, the computing machine 1500.

At operation 1402, the computing machine receives, as input, a plurality of data examples (e.g. input/output (I/O) pairs).

At operation 1404, the computing machine computes a modified Z-score (z*-score) for the data examples (or a portion of the data examples). The z*-score is computed as (value−mean)/average deviation (versus standard deviation that is used to compute the standard Z-score). The value is the value of the data example. The mean is the mean of the data example values. The average deviation is calculated according to:

$$\text{Average Deviation} = \sum_{i=1}^{K} |x_i - \mu| / K$$

In the above equation, there are K data examples $x_i$ for i=1 to K. The value μ represents the mean of the K data examples $x_i$.

At operation 1406, the computing machine sets a layer number (N) to one. At operation 1408, the computing machine proceeds to the $N^{th}$ layer. At operation 1410, the computing machine calculates a next variable or metavariable from the data examples in a layer corresponding to the layer number. The variable combination can include one or more of the individuals generated by a GEP technique.

At operation 1412, the computing machine computes a multivariable linear regression for the currently selected variable.

At operation 1414, the computing machine determines whether a residual sum of squares (RSS) error for the multivariable linear regression is less than that for at least one of a best M variables (or metavariables) to carry to the next layer. M is a predetermined positive integer, such as three (3) or another positive integer. If the RSS error is less than that for at least one of the best M variable combinations, the method 1400 continues to operation 1416. Otherwise, the method 1400 skips operation 1416 and continues to operation 1418.

At operation 1416, upon determining that the RSS error is less than that for at least one of the best M variable combinations, the computing machine adds the currently selected variable combination to the best M variable combinations (possibly replacing the "worst" of the best M variable combinations, i.e., the one having the largest RSS error).

At operation 1418, the computing machine tests the RSS error against stopping criteria. Any predetermined stopping criteria may be used. The stopping criteria may be the RSS error being less than a standard deviation of the output variable in the data examples. Alternatively, the stopping criteria may be the RSS error being less than a standard deviation of the output variable in the data examples divided by the number of samples for that output variable. Alternatively, the stopping criteria may be one or more (e.g., all) of the best M variable combinations being a function of previous layer outputs. If the test is passed, the method 1400 continues to operation 1424. If the test is failed, the method 1400 continues to operation 1420.

At operation 1420, upon determining that that the test is failed, the computing machine determines whether each and every one of the variable combinations has been used. If so, the method 1400 continues to operation 1422. If not, the method 1400 returns to operation 1410.

At operation 1422, upon determining that each and every one of the variable combinations has been used, the computing machine determines whether N is greater than or equal to the total number of layers. If so, the method 1400 continues to operation 1424. If not, the method 1400 continues to operation 1426.

At operation 1424, upon determining that N is greater than or equal to the total number of layers, the computing machine outputs the model source code. After operation 1424, the method 1400 ends.

At operation 1426, upon determining that N is less than the total number of layers, the computing machine provides the best M variables as input to the next layer.

At operation 1428, the computing machine increments N by one to allow for processing of the next layer. After operation 1428, the method 1400 returns to operation 1408.

Some aspects of the technology disclosed herein can be implemented on a GPU (graphics processing unit), such as a Tx2 GPU board (developed by NVIDIA Corporation of Santa Clara, Calif.). Some aspects could be implemented using an ASIC (application-specific integrated circuit) processor or a FPGA (field programmable gate array) processor. In some cases, for instance with the ASIC or FPGA implementation, the Turlington polynomial and its derivatives may be represented in pre-tabulated meta-variable look-up tables (LUTs) for embedded execution. The LUTs may be arranged in series and/or in parallel. Each LUT may receive one or more inputs and may generate an output based on its inputs. In some cases, exported single pass data model terms achieve convolutions in computational memory, rather than explicitly in code. In some cases, left-to-right, column-to-column evaluation of a data model for FPGA processing is implemented.

Some aspects relate to discrete real-time embedded decision architectures. Some aspects are directed to solving the problem of how to achieve information awareness—having the right information at the right time to make critical decisions. One solution is to enable sensors to maintain situational awareness, such as through behavior monitoring. One approach combines fractal math and analytical equations to yield a data model. The data model is combined with spatial voting to yield predictive analytics and anomaly detection.

Modeling may use no compression. Modeling may generate unlimited amounts of higher or coarser resolution data. Models may be fixed in length (measured in SLOC (source lines of code)) regardless of the training data length. In modeling, complicated dynamics of training data are preserved and can be used to generate new data sets. Models may be exported in Ada, Fortran or C++ and may be platform and/or processor independent.

Compression may use data preprocessing and/or encoding. Decompression may yield the original data set. Compressed data sets may not be of fixed length and the length may be driven by the training data. Training data dynamics might not be captured or preserved. Original data may, in some cases, be lost and not directly accessible without decompression.

A decision architecture may include classifiers and controllers. The classifier may be a data model network or tree for making a multi-class decision. The controller may be a data model deciding between two other data model branches. Siphoning at the classifier level may, in some cases, lead to convergence with a fixed number of classifiers. The classifiers may be analyzed to determine which are the most similar. The controller network may be used to decide about which classifier to use. New data may cause the addition of a new branch, which does not require retraining of the entire network. In some cases, a classifier that is most similar to the new branch may be selected.

Embedded data model controllers may be used in the context of an unmanned aerial vehicle (UAV). The UAV sensor surveys the area and assesses the situation. It reports and telemeters significant anomalies. The UAV forms a hypothesis and shares it with the network. It generates a data model of nominal behaviors. The existence of a hypothesis forms a disembodied domain expert. There is situational awareness of the cyber-scene. The UAV provides substantiating evidence (raw data) upon demand to the network. As more and more data is taken and/or network feedback occurs, the hypothesis evolves. The discrete embedded form of the nominal data model (spatial voting (SV) grid) is updated.

The technology may be used in the data preservation context. The problem is the inability to store instrument data to perform equipment diagnostics and integrated mission assessment. One scheme includes non-filed accessible limited format data logging instructions. Some equipment has no internal data logging capacity. In other equipment, data memory enables only the most recent short histories to be saved. Data might not be accessible for in-field diagnostics. One problem is that nominal sensor conditions change during the mission due to changes in aircraft, such as equipment failure, equipment loss, or equipment interference. One solution to the above problems is a pilot specified alarm protocol (PSAP) system.

Data includes measurements prior to descriptive feature extraction (e.g., engine temperature, altitude, airspeed, etc.). Features include characteristics derived from the data (e.g., mean, standard deviation, skewness, kurtosis, etc.). Data models include mathematical relationships between features.

Some aspects use the data model that is derived from a bottoms up self-organizing process into the multivariable continuous function that explains the target data do be predicted from the available sensor measurements. The explanation might, in some cases, be exact (100%) accurate (specificity of 1 and sensitivity of 1). If the machine is unable to do so, it can conclude that it lacks sufficient relevant sensors of adequate type placement sensitivity. Some aspects may lack orthogonalized features extracted from those sensors and are experiencing over fit bias from data multicollinearity in each case resulting in an "approximation" but not an explanation. In some cases, only an explanation suffices as a testable "hypothesis" explaining all observations.

Some aspects leverage software or hardware programmed using one or more of: C, CUDA, and a Tx2 GPU board. Some aspects implement the algorithms disclosed herein using one or more of: Python, C, CUDA, and/or Tx2 GPU enabling full embedded processing and functional decomposition.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA), graphics processing unit (GPU), or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The transformation of encoded data into a 2D representation forms an "image" of SV grid data. This image may be operated on using conventional image processing techniques including convolution operators, foreground background segmentation, edge detection, texture characterization, morphological image operators, and image algebra including affine transformations and projections, among others. The image format also enables optical processing and optical computer techniques to be applied enabling spatial matched filtering, holography, Fourier, Gabor, and wavelet transformation, optical neural network connectionist architecture representation, complementary metal oxide semiconductor (CMOS) focal plane array integrated monolithic hybrid meta-material structures (including but not limited to non-linear optically active crystals and nano-structures) to be used for encoding and reading out SV patterns as well as transforming and partitioning the data thereby represented using purely optical and meta-material embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, (e.g., a computer program tangibly embodied in an information carrier, such as in a machine-readable medium for execution by, or to control the operation of, data processing apparatus, such as a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., an FPGA, GPU, ASIC, or optical computer or hybrid meta-material element. In some embodiments, the number of generations produced until convergence is less than 20,000, thus expediting convergence.

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 15:
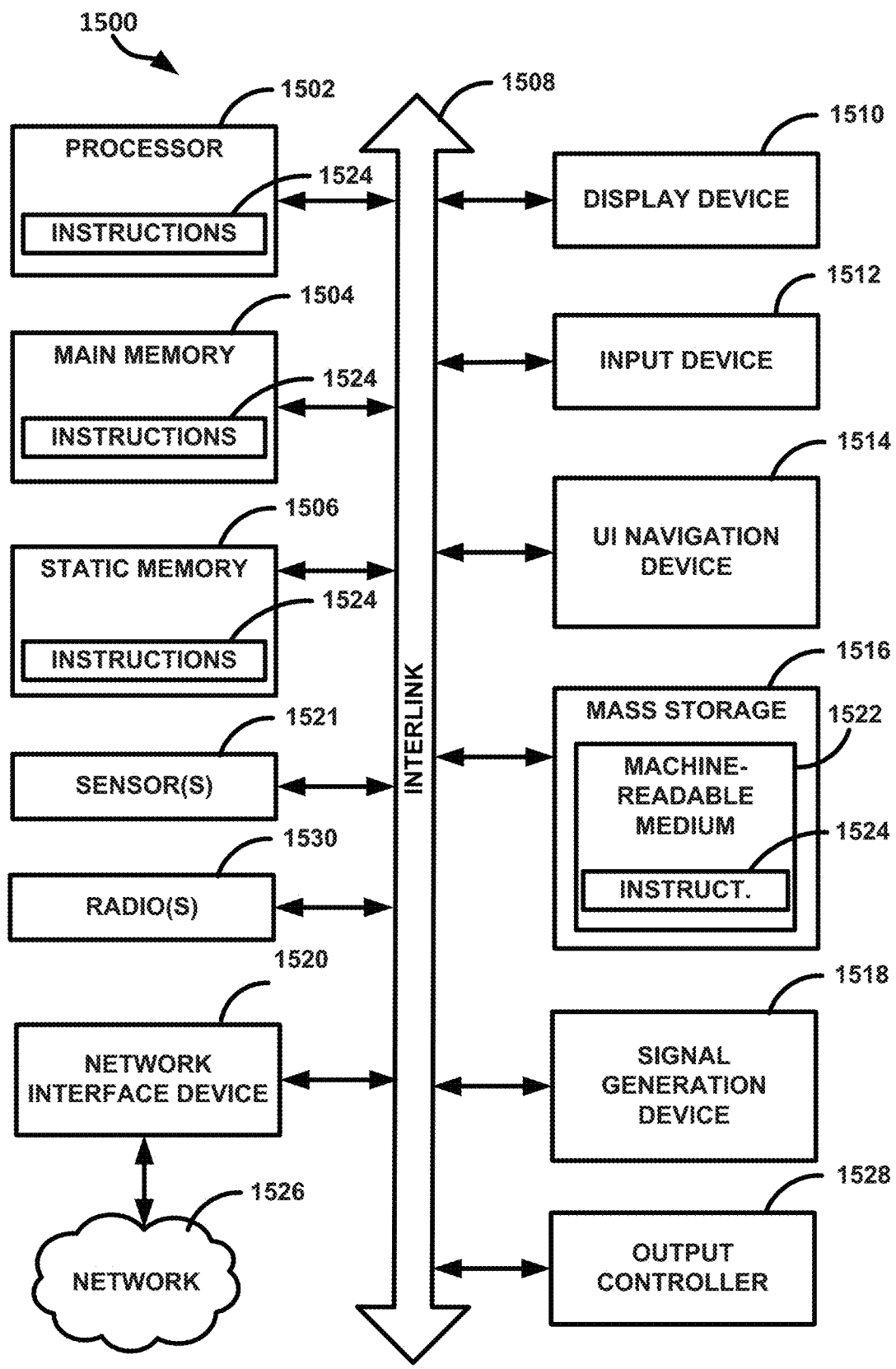
FIG. 15 illustrates, by way of example, a block diagram of an embodiment of a machine in the example form of a computer system within which instructions, for causing the machine to perform any one or more of the methodologies discussed herein, may be executed.

FIG. 15 illustrates, by way of example, a block diagram of an embodiment of a machine in the example form of a computer system 1500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker), a network interface device 1520, and radios 1530 such as Bluetooth, WWAN, WLAN, and NFC, permitting the application of security controls on such protocols.

Machine-Readable Medium

The disk drive unit 1516 includes a machine-readable medium 1522 on which is stored one or more sets of instructions and data structures (e.g., software) 1524 embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks or hybrid meta-materials.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Further examples are provided to aid in understanding details of subject matter disclosed.

Example 1 includes a technique for behavior monitoring of a device, the technique comprising receiving data indicating behaviors of the device, determining, using a gene expression programming (GEP) method, a data model that explains the data, and comparing further data indicating further behavior of the device to the data model to determine whether the further behavior is explained by the data model.

In Example 2, Example 1 further includes, wherein the GEP method includes determining whether to perform an alteration of an individual of a population based on a first seed value, a second seed value, a first function, and a second different function.

In Example 3, Example 2 further includes, wherein the second function is orthogonal to the first function.

In Example 4, Example 3 further includes, wherein the first and second functions are cyclic.

In Example 5, Example 4 further includes, wherein the first and second functions are periodic.

In Example 6, Example 5 further includes, wherein the first seed value is used as input to the first function to generate a first intermediate value, the second seed value is used as input to the second function to generate a second intermediate value, the first and second intermediate values are mathematically combined to generate a result, and the determination of whether to alter the individual includes comparing the result to a threshold value and performing the alteration in response to determining the result is greater than the threshold value.

In Example 7, Example 6 further includes, wherein the first seed value is raised to a power before being used as input into the first function.

In Example 8, Example 7 further includes, wherein the power is a transcendental number.

In Example 9, at least one of Examples 1-8 further includes, wherein an individual of the population includes a complete polynomial.

Example 10 includes a non-transitory machine-readable medium including instructions that, when executed by a machine, cause the machine to perform operations for behavior monitoring of a device, the operations comprising receiving data indicating behaviors of the device, determining, using a gene expression programming (GEP) method, a data model that explains the data; and comparing further data indicating further behavior of the device to the data model to determine whether the further behavior is explained by the data model.

In Example 11, Example 10 further includes, wherein the GEP method includes determining whether to perform an alteration of an individual of a population based on a first seed value, a second seed value, a first function, and a second different function.

In Example 12, Example 11 further includes, wherein the second function is orthogonal to the first function.

In Example 13, Example 12 further includes, wherein the first and second functions are cyclic.

In Example 14, Example 13 further includes, wherein the first and second functions are periodic.

In Example 15, Example 14 further includes, wherein the first seed value is used as input to the first function to generate a first intermediate value, the second seed value is used as input to the second function to generate a second intermediate value, the first and second intermediate values are mathematically combined to generate a result, and the determination of whether to alter the individual includes comparing the result to a threshold value and performing the alteration in response to determining the result is greater than the threshold value.

In Example 16, Example 15 further includes, wherein the first seed value is raised to a power before being used as input into the first function.

Example 17 includes an apparatus comprising processing circuitry and memory, the processing circuitry coupled to the memory and configured to perform operations comprising receiving data indicating behaviors of the device, determining, using a gene expression programming (GEP) method, a data model that explains the data, and comparing further data indicating further behavior of the device to the data model to determine whether the further behavior is explained by the data model.

In Example 18, Example 17 further includes, wherein the GEP method includes determining whether to perform an alteration of an individual of a population based on a first seed value, a second seed value, a first function, and a second different function, wherein the second function is orthogonal to the first function, the first seed value is used as input to the first function to generate a first intermediate value, the second seed value is used as input to the second function to generate a second intermediate value, the first and second intermediate values are mathematically combined to generate a result, the determination of whether to alter the individual includes comparing the result to a threshold value and performing the alteration in response to determining the result is greater than the threshold value, and the first seed value is raised to a power before being used as input into the first function.

In Example 19, Example 18 further includes, wherein the power is a transcendental number.

In Example 20, at least one of Examples 17-19 further includes, wherein an individual of the population includes a complete polynomial.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for behavior monitoring of a device, the method comprising:
producing, by a device, an output indicating a behavior of the device;
receiving, by a device monitor comprising genetic modeling circuitry, the output;
determining, by the genetic modeling circuitry using a gene expression programming (GEP) method, a data model that explains the data, the GEP method including:
generating a result that is a pseudorandom number by:
operating a first function using a first seed value as input resulting in a first intermediate value;
operating a second function using a second seed value as input resulting in a second intermediate value, the second function orthogonal to the first function; and
combining the first and second intermediate values resulting in the result;
comparing the result to a threshold value;
performing an alteration of an individual of a population in response to determining the result is greater than the threshold value resulting in an altered population; and
generating the data model based on the altered population;
comparing future data indicating future behavior of the device to the data model;
determining, based on the comparison, whether the future behavior is explained by the data model; and
issuing an alert, when the future behavior is not consistent with the data model, the alert indicating the device is exhibiting anomalous behavior.

2. The method of claim 1, wherein the first and second functions are cyclic.

3. The method of claim 2, wherein the first and second functions are periodic.

4. The method of claim 3, wherein the first seed value is raised to a power before being used as input into the first function.

5. The method of claim 4, wherein the power is a transcendental number.

6. The method of claim 1, wherein each individual of the population includes a complete polynomial.

7. A non-transitory machine-readable medium including instructions that, when executed by a machine, cause the machine to perform operations for behavior monitoring of a device, the operations comprising:
producing, by a device, an output indicating a behavior of the device;
receiving, by a device monitor comprising genetic modeling circuitry, the output;
determining, by the genetic modeling circuitry using a gene expression programming (GEP) method, a data model that explains the data, the GEP method including:
generating a result that is a pseudorandom number by:
operating a first function using a first seed value as input resulting in a first intermediate value;
operating a second function using a second seed value as input resulting in a second intermediate value, the second function orthogonal to the first function; and
combining the first and second intermediate values resulting in the result;
comparing the result to a threshold value;
performing an alteration of an individual of a population in response to determining the result is greater than the threshold value resulting in an altered population; and
generating the data model based on the altered population;
comparing future data indicating future behavior of the device to the data model;
determining, based on the comparison, whether the future behavior is explained by the data model; and
issuing an alert, when the future behavior is not consistent with the data model, the alert indicating the device is exhibiting anomalous behavior.

8. The non-transitory machine-readable medium of claim 7, wherein the first and second functions are cyclic.

9. The non-transitory machine-readable medium of claim 8, wherein the first and second functions are periodic.

10. The non-transitory machine-readable medium of claim 9, wherein the first seed value is raised to a power before being used as input into the first function.

11. An apparatus comprising:
processing circuitry and memory;
the processing circuitry coupled to the memory and configured to perform operations comprising:
producing an output indicating a behavior of the device;
receiving, by a device monitor comprising genetic modeling circuitry, the output;
determining, by the genetic modeling circuitry using a gene expression programming (GEP) method, a data model that explains the data, the GEP method including:
generating a result that is a pseudorandom number by:
operating a first function using a first seed value as input resulting in a first intermediate value;
operating a second function using a second seed value as input resulting in a second intermediate value, the second function orthogonal to the first function; and
combining the first and second intermediate values resulting in the result;
comparing the result to a threshold value;
performing an alteration of an individual of a population in response to determining the result is greater than the threshold value resulting in an altered population; and
generating the data model based on the altered population;
comparing future data indicating future behavior of the device to the data model;
determining, based on the comparison, whether the future behavior is explained by the data model; and
issuing an alert, when the future behavior is not consistent with the data model, the alert indicating the device is exhibiting anomalous behavior.

12. The apparatus of claim 11, wherein the first seed value is raised to a power before being used as input into the first function.

13. The apparatus of claim 12, wherein the power is a transcendental number.

14. The apparatus of claim 11, wherein each individual of the population includes a complete polynomial.

* * * * *